US012426091B2

(12) United States Patent
Pan et al.

(10) Patent No.: US 12,426,091 B2
(45) Date of Patent: Sep. 23, 2025

(54) CHANNEL SOUNDING METHOD AND COMMUNICATION APPARATUS

(71) Applicant: HUAWEI TECHNOLOGIES CO., LTD., Guangdong (CN)

(72) Inventors: Dongcheng Pan, Nanjing (CN); Bo Yang, Nanjing (CN); Peng Chen, Nanjing (CN); Yinliang Hu, Nanjing (CN); Bing Feng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 387 days.

(21) Appl. No.: 17/993,228

(22) Filed: Nov. 23, 2022

(65) Prior Publication Data
US 2023/0087939 A1    Mar. 23, 2023

Related U.S. Application Data

(63) Continuation of application No. PCT/CN2021/090602, filed on Apr. 28, 2021.

(30) Foreign Application Priority Data

May 26, 2020   (CN) .......................... 202010457804.X

(51) Int. Cl.
*H04W 74/0816* (2024.01)
*H04L 5/00* (2006.01)

(52) U.S. Cl.
CPC ....... *H04W 74/0816* (2013.01); *H04L 5/0048* (2013.01)

(58) Field of Classification Search
CPC . H04W 74/0816; H04W 24/10; H04W 24/08; H04L 5/0048; H04L 5/0035; H04B 7/0634
See application file for complete search history.

(56) References Cited

U.S. PATENT DOCUMENTS 10,420,121 B2 * 9/2019 Hedayat .............. H04L 27/2613
10,750,395 B2 * 8/2020 Zhou ..................... H04W 24/10

FOREIGN PATENT DOCUMENTS

WO   WO-2020097444 A1 *  5/2020  ............. H04B 7/024
WO     2020182040 A1      9/2020

OTHER PUBLICATIONS

Roya Doostnejad (Intel): "Multi-AP Implicit Channel Sounding", IEEE 802.11-20/0089-r1, Jan. 16, 2020 (jan. 16, 2020), pp. 1-17, XP068165415, Retrieved from the Internet: URL-:https://mentor. ieee.org/802.1 1/den/20/1 1-20-0089-01-00be-multi-ap-implicit-channel-sounding.pptx [retrieved on Jan. 17, 2020] (Year: 2020).*

(Continued)

*Primary Examiner* — Cheikh T Ndiaye
(74) *Attorney, Agent, or Firm* — Fish & Richardson P.C.

(57) ABSTRACT

This application discloses channel sounding methods and communication apparatuses. One method includes: receiving, by a second access point, a user association frame from a first access point, wherein the user association frame carries identification information of a first station and is used to determine a first channel sounding result of the first station associated with the first access point, and determining, by the second access point, the first channel sounding result from a plurality of second channel sounding results based on the user association frame, wherein the plurality of second channel sounding results are obtained by the second access point by performing sounding on a plurality of channel sounding frames from a plurality of stations.

16 Claims, 7 Drawing Sheets

(56) References Cited

OTHER PUBLICATIONS

IEEE Std 802.11-2016, "IEEE Standard for Information technology—Telecommunications and information exchange between systems Local and metropolitan area networks—Specific requirements; Part 11: Wireless LAN Medium Access Control (MAC) and Physical Layer (PHY) Specifications," Dec. 7, 2016, 3534 pages.

Doostnejad et al., "Multi-AP Implicit Channel Sounding," IEEE 802.11-20/0089-r1, Jan. 16, 2020, pp. 1-17.

IEEE P802.11ax/D4.1, "Draft Standard for Information technology—Telecommunications and information exchange between systems Local and metropolitan area networks—Specific requirements; Part 11: Wireless LAN Medium Access Control (MAC) and Physical Layer (PHY) Specifications Amendment 1: Enhancements for High Efficiency WLAN," Apr. 2019, 754 pages.

IEEE Std 802.11ac-2013, "IEEE Standard for Information technology—Telecommunications and information exchange between systems Local and metropolitan area networks—Specific requirements, Part 11: Wireless LAN Medium Access Control (MAC) and Physical Layer (PHY) Specifications; Amendment 4: Enhancements for Very High Throughput for Operation in Bands below 6 GHz," Dec. 11, 2013, 425 pages.

IEEE Std 802.11n-2009, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," Sep. 11, 2009, 536 pages.

IEEE Std 802.11a-1999, "Supplement to IEEE Standard for Information technology—Telecommunications and information exchange between systems—Local and metropolitan area networks Specific requirements—Part 11: Wireless LAN Medium Access Control (MAC) and Physical Layer (PHY) specifications: High-speed Physical Layer in the 5 GHZ Band," Sep. 16, 1999, 90 pages.

Extended European Search Report in European Appln No. 21811932.9, dated Oct. 4, 2023, 8 pages.

\* cited by examiner

CHANNEL SOUNDING METHOD AND COMMUNICATION APPARATUS

CROSS-REFERENCE TO RELATED APPLICATIONS

This application is a continuation of International Application No. PCT/CN2021/090602, filed on Apr. 28, 2021, which claims priority to Chinese Patent Application No. 202010457804. X, filed on May 26, 2020. The disclosures of the aforementioned applications are hereby incorporated by reference in their entireties.

TECHNICAL FIELD

This application relates to the field of wireless fidelity technologies, and in particular, to a channel sounding method and a communication apparatus.

BACKGROUND

The 802.11 standard supports inter-frequency deployment of adjacent access points (APs). In other words, different center frequencies of frequency band resources are allocated to adjacent APs (which may also be considered that different frequency band resources are allocated to the adjacent APs), and data is transmitted on the allocated resources. If a wide frequency band resource is allocated to an AP, there is no sufficient resource for inter-frequency deployment of all APs. As a result, a plurality of APs are deployed on a same frequency.

When the plurality of APs are deployed, a physical space distance between them needs to meet a specific distance, to avoid interference to data transmission of the plurality of APs. Alternatively, the plurality of APs need to perform data transmission on the allocated resources according to the carrier sense multiple access/collision detection (CSMA/CA) protocol, to he specific, only one AP can perform data transmission at a same moment.

To improve a network transmission rate, the plurality of APs may be allowed to concurrently send data. However, it needs to be ensured that the plurality of APs do not interfere with each other, in other words, a station (STA) associated with an AP is not interfered by data sending of another AP. The plurality of APs may be allowed to concurrently send data in an interference nulling mode. However, in the interference nulling mode, channel sounding needs to be performed across APs, to be specific, each AP in the plurality of intra-frequency deployed APs not only needs to obtain a channel state of a STA associated with the AP, but also needs to obtain a channel state of a STA not associated with the AP.

How to perform channel sounding across APs is an urgent technical problem to be resolved currently.

SUMMARY

This application provides a channel sounding method and a communication apparatus, to perform channel sounding across APs, so as to increase a data transmission rate in a network as much as possible.

According to a first aspect, an embodiment of this application provides a channel sounding method. The method may be performed by a first apparatus. The first apparatus may be a communication device or a communication apparatus that can support the communication device to implement functions required for the method, for example, a chip system. For example, the communication device is a second access point. The method includes the following steps:

The second access point receives a user association frame from a first access point. The user association frame carries identification information of a first station and is used to determine a first channel sounding result of the first station. The first station is associated with the first access point.

The second access point determines the first channel sounding result from a plurality of second channel sounding results based on the user association frame. The plurality of second channel sounding results are obtained by the second access point by performing sounding on a plurality of channel sounding frames from a plurality of stations. The channel sounding frame is used for channel sounding.

In this embodiment of this application, the user association frame carries the identification information of the first station associated with the first access point, and the first access point may send the user association frame to the second access point. In this way, the second access point can learn of the identification information of the first station, to determine the first channel sounding result that matches the first station from the plurality of second channel sounding results that are obtained from the channel sounding frames reported by the plurality of stations. In other words, channel sounding is performed across access points, so that a plurality of intra-frequency deployed adjacent access points can concurrently send data, and a data transmission rate in an entire network is improved.

In a possible implementation, that the second access point determines the first channel sounding result from the plurality of second channel sounding results based on the user association frame includes:

The second access point receives a channel sounding instruction from a controller or a central access point, and determines the first channel sounding result from the plurality of second channel sounding results. The channel sounding instruction indicates the second access point to perform sounding on the plurality of channel sounding frames. The plurality of stations include the first station, and the first station is not associated with the second access point.

In this solution, the second access point may obtain, under control of the controller or the central access point, the first channel sounding result that matches the first station. In this way, the second access point does not perform unnecessary channel sounding, to reduce workload of the second access point as much as possible.

In a possible implementation, that the second access point determines the first channel sounding result from the plurality of second channel sounding results based on the user association frame includes:

The second access point determines at least one second channel sounding result that meets a first preset condition in the plurality of second channel sounding results as the first channel sounding result. The first preset condition is that a difference between a receiving moment of a channel sounding frame corresponding to the second channel sounding result and a receiving moment of a channel sounding frame received by the first access point from the first station falls within a first preset range.

It should be understood that the first station sends channel sounding frames, and if a difference between receiving moments at which the first access point and the second access point receive a channel sounding frame is small, it may be considered that the channel sounding frame separately received by the first access point and the second access point may be a same channel sounding frame. Therefore, in this solution, the first channel sounding result may be determined from the plurality of second channel sounding results based on the receiving moments at which the two access points separately receive the channel sounding frame.

In a possible implementation, that the second access point determines the first channel sounding result from the plurality of second channel sounding results based on the user association frame further includes:

The second access point determines, based on packet length information, the first channel sounding result from the at least one second channel sounding result that meets the first preset condition. The packet length information indicates a length of the channel sounding frame sent by the first station to the first access point. The packet length information is carried in the user association frame; and/or the second access point determines, based on packet fingerprint information, the first channel sounding result from the at least one second channel sounding result that meets the first preset condition. The packet fingerprint information indicates length information of a channel sounding frame sent by the first station to the first access point. The packet fingerprint information is carried in the user association frame.

Because a plurality of STAs may simultaneously send channel sounding frames, there are a plurality of second channel sounding results that meet the first preset condition. In this solution, the second access point may further determine, based on a length and the like of the channel sounding frame sent by each station, the first channel sounding result from the at least one second channel sounding result that meets the first preset condition, to improve accuracy of the first channel sounding result.

In a possible implementation, that the second access point determines, based on packet length information, the first channel sounding result from the at least one second channel sounding result that meets the first preset condition includes:

The second access point determines a second channel sounding result that meets a second preset condition in the at least one second channel sounding result that meets the first preset condition as the first channel sounding result. The second preset condition is that a packet length of the channel sounding frame corresponding to the second channel sounding result and a packet length of the channel sounding frame received by the first access point from the first station are the same or have a minimum difference.

It should be understood that two channel sounding frames whose packet lengths are the same or whose difference is the minimum may be a same channel sounding frame. Therefore, a second channel sounding result corresponding to the channel sounding frames whose packet lengths are the same or whose difference is the minimum may be used as the first channel sounding frame.

In a possible implementation, that the second access point determines, based on packet fingerprint information, the first channel sounding result from the at least one second channel sounding result that meets the first preset condition includes:

The second access point determines a second channel sounding result that meets a third preset condition in the at least one second channel sounding result that meets the first preset condition as the first channel sounding result. The third preset condition is that packet fingerprint information of the channel sounding frame corresponding to the second channel sounding result is the same as the packet fingerprint information.

In this solution, in addition to the packet length information, the packet fingerprint information may further include other information used to represent a packet. If packet fingerprint information of two channel sounding frames is the same, the two channel sounding frames are the same channel sounding frame. Therefore, a second channel sounding result corresponding to channel sounding frames with the same packet fingerprint information may be used as the first channel sounding result.

In a possible implementation, the method further includes:

The second access point performs timing synchronization with the first access point.

It should be understood that the two access points are synchronized in time, and whether received channel sounding frames are a same channel sounding result may be determined based on receiving moments of the channel sounding frames. Therefore, in this embodiment of this application, the first access point may perform timing synchronization with the second access point.

According to a second aspect, an embodiment of this application provides another channel sounding method. The method may be performed by a second apparatus. The second apparatus may be a communication device or a communication apparatus that can support the communication device to implement functions required for the method, for example, a chip system. For example, the communication device is a first access point. The method includes the following steps:

The first access point performs channel sounding on a channel sounding frame sent by a first station. The channel sounding frame is used for channel sounding. The first station is associated with the first access point.

The first access point sends a user association frame to a second access point. The user association frame carries identification information of the first station, and is used to determine a first channel sounding result that matches the first station from a plurality of second channel sounding results. The plurality of second channel sounding results are obtained by the second access point by performing sounding on a plurality of channel sounding frames from a plurality of stations. The plurality of stations include the first station, and the first station is not associated with the second access point.

In this embodiment of this application, the user association frame carries the identification information of the first station associated with the first access point, and the first access point may send the user association frame to the second access point. In this way, the second access point can learn of the identification information of the first station, to determine the first channel sounding result that matches the first station from the plurality of second channel sounding results that are obtained from the channel sounding frames reported by the plurality of stations. In other words, channel sounding is performed across access points, so that a plurality of intra-frequency deployed adjacent access points can concurrently send data, and a data transmission rate in an entire network is improved.

In a possible implementation, the first access point sending a user association frame to a second access point includes:

The first access point receives a channel sounding instruction from a controller or a central access point, and sends the user association frame to the second access point. The channel sounding instruction indicates the first access point to perform channel sounding and send the user association frame to the second access point.

In this solution, the first access point may send the user association frame to the second access point under control of the controller or the central access point. In this way, the first access point does not send an unnecessary user association frame, to reduce a quantity of times that the first access point sends user association frames as much as possible.

In a possible implementation, the user association frame carries a first receiving moment. The first receiving moment is a receiving moment at which the first access point receives the channel sounding frame sent by the first station. The first receiving moment is determined based on a system time point of the first access point. The system time point of the first access point is synchronized with a system time point of the second access point.

It should be understood that if a difference between receiving moments at which the first access point and the second access point receive a channel sounding frame is small, it may be considered that the channel sounding frame separately received by the first access point and the second access point may be a same channel sounding frame. Therefore, in this solution, the user association frame may carry the first receiving moment, so that the second access point can determine the first channel sounding result from the plurality of second channel sounding results based on the first receiving moment.

In a possible implementation, the user association frame further includes packet length information and/or packet fingerprint information. The packet length information indicates a length of the channel sounding frame received by the first access point from the first station. The packet fingerprint information includes the packet length information.

In this solution, the user association frame may further include packet length information and/or packet fingerprint information. In this way, in a case of at least two second channel sounding results that meet the first preset condition, the first channel sounding result may be further determined, to improve accuracy of the first channel sounding result.

In a possible implementation, the packet length information is determined based on information carried in a signal field in a physical layer protocol data unit (PPDU). The channel sounding frame is carried in the PPDU.

Alternatively, the packet length information is determined based on a difference of moments indicated by a physical layer receive end indication PHY-RXEND.indication and a physical layer receive start indication PHY-RXSTART.indication that are received by a media access control (MAC) layer.

Alternatively, the packet length information is determined based on a start moment and an end moment of a clear channel assessment (CCA) during reception of the channel sounding frame sent by the first station.

In this embodiment of this application, there are the above manners of determining the packet length information. A specific manner to be used is not limited in this embodiment of this application.

In a possible implementation, the channel sounding frame received by the first access point from the first station is carried in a PPDU. The packet fingerprint information is determined based on information carried in a signal field in the PPDU.

In this embodiment of this application, the channel sounding frame may be a dedicated channel sounding frame, for example, a null data (null data packet, NDP) frame, or a data frame, a control frame, or a management frame defined in the 802.11 standard and another wireless standard. The channel sounding frame may be carried in the PPDU, which facilitates compatibility with the 802.11 standard.

In a possible implementation, the method further includes:

The first access point sends a channel sounding announcement frame to the controller or the central access point. The channel sounding announcement frame includes a channel sounding state. The channel sounding state indicates that a channel sounding result is correct, incorrect, or lost.

The first access point may report the channel sounding state to the controller or the central access point, so that the controller or the central access point manages the channel sounding state of the first access point.

According to a third aspect, an embodiment of this application provides a signal quality sounding method. The method may be performed by a first apparatus. The first apparatus may be a communication device or a communication apparatus that can support the communication device to implement functions required for the method, for example, a chip system. For example, the communication device is a second access point. The method includes the following steps:

The second access point receives a user association frame from a first access point. The user association frame carries identification information of a first station and is used to determine a first signal quality sounding result of the first station. The first station is associated with the first access point. The signal quality is determined based on a received signal strength (RSS) or a received signal strength indicator (RSSI).

The second access point determines the first signal quality sounding result from a plurality of second signal quality sounding results based on the user association frame. The plurality of second signal quality sounding results are obtained by the second access point by performing sounding on a plurality of signal sounding frames from a plurality of stations.

In this embodiment of this application, the cross-AP channel sounding method provided in the first aspect may be extended to cross-AP RSS and RSSI sounding, which has a wider application scope.

Similarly, in a possible implementation, that the second access point determines the first signal quality sounding result from the plurality of second signal quality sounding results based on the user association frame includes:

The second access point receives a channel sounding instruction from a controller or a central access point, and determines the first signal quality sounding result from the plurality of second signal quality sounding results. The channel sounding instruction indicates the second access point to perform sounding on the plurality of signal sounding frames. The plurality of stations include the first station, and the first station is not associated with the second access point.

In a possible implementation, that the second access point determines the first signal quality sounding result from the plurality of second signal quality sounding results based on the user association frame includes:

The second access point determines at least one second signal quality sounding result that meets a first preset condition in the plurality of second signal quality sounding results as the first signal quality sounding result. The first preset condition is that a difference between a receiving moment of a signal sounding frame corresponding to the second signal quality sounding result and a receiving moment of a signal sounding frame received by the first access point from the first station falls within a first preset range.

In a possible implementation, that the second access point determines the first signal quality sounding result from the plurality of second signal quality sounding results based on the user association frame further includes:

The second access point determines, based on packet length information, the first signal quality sounding result from the at least one second signal quality sounding result that meets the first preset condition, where the packet length information indicates a length of the signal sounding frame sent by the first station to the first access point, and the packet length information is carried in the user association frame; and/or the second access point determines, based on packet fingerprint information, the first signal quality sounding result from the at least one second signal quality sounding result that meets the first preset condition, where the packet fingerprint information indicates length information of a signal sounding frame sent by the first station to the first access point, and the packet fingerprint information is carried in the user association frame.

In a possible implementation, that the first access point determines, based on packet length information, the first signal quality sounding result from the at least one second signal quality sounding result that meets the first preset condition includes:

The second access point determines a second signal quality sounding result that meets a second preset condition in the at least one second signal quality sounding result that meets the first preset condition as the first signal quality sounding result. The second preset condition is that a packet length of the signal sounding frame corresponding to the second signal quality sounding result and a packet length of the signal sounding frame received by the first access point from the first station are the same or have a minimum difference.

In a possible implementation, that the second access point determines, based on packet fingerprint information, the first signal quality sounding result from the at least one second signal quality sounding result that meets the first preset condition includes:

The second access point determines a second signal quality sounding result that meets a third preset condition in the at least one second signal quality sounding result that meets the first preset condition as the first signal quality sounding result. The third preset condition is that packet fingerprint information of the signal sounding frame corresponding to the second signal quality sounding result is the same as the packet fingerprint information.

In a possible implementation, the method further includes:

The second access point performs timing synchronization with the first access point.

According to a fourth aspect, an embodiment of this application provides a signal quality sounding method. The method may be performed by a first apparatus. The first apparatus may be a communication device or a communication apparatus that can support the communication device to implement functions required for the method, for example, a chip system. For example, the communication device is a second access point. The method includes the following steps:

A first access point performs channel sounding on a first signal sent by a first station. The first signal is used for RSS or RSSI sounding, and the first station is associated with the first access point.

The first access point sends a user association frame to a second access point. The user association frame carries identification information of the first station, and is used to determine a first signal quality sounding result that matches the first station from a plurality of second signal quality sounding results. The plurality of second signal quality sounding results are obtained by the second access point by performing sounding on a plurality of first signals from a plurality of stations. The plurality of stations include the first station, and the first station is not associated with the second access point.

In this embodiment of this application, the cross-AP channel sounding method provided in the second aspect may be extended to cross-AP RSS and RSSI sounding, which has a wider application scope.

Similarly, in a possible implementation, the first access point sending the user association frame to the second access point includes:

The first access point receives a channel sounding instruction from a controller or a central access point, and sends the user association frame to the second access point. The channel sounding instruction indicates the first access point to perform sounding on a received signal sounding frame and send the user association frame to the second access point.

In a possible implementation, the user association frame carries a first receiving moment. The first receiving moment is a receiving moment at which the first access point receives the signal sounding frame sent by the first station. The first receiving moment is determined based on a system time point of the first access point. The system time point of the first access point is synchronized with a system time point of the second access point.

In a possible implementation, the user association frame further includes packet length information and/or packet fingerprint information. The packet length information indicates a length of the signal sounding frame received by the first access point from the first station. The packet fingerprint information includes the packet length information.

In a possible implementation, the packet length information is determined based on information carried in a signal field in a PPDU. The signal sounding frame is carried in the PPDU.

Alternatively, the packet length information is determined based on a difference of moments indicated by a physical layer receive end indication PHY-RXEND.indication and a physical layer receive start indication PHY-RXSTART.indication that are received by a MAC layer.

Alternatively, the packet length information is determined based on a start moment and an end moment of a CCA during reception of the signal sounding frame sent by the first station.

In a possible implementation, the signal sounding frame received by the first access point from the first station is carried in a PPDU. The packet fingerprint information is determined based on information carried in a signal field in the PPDU.

In a possible implementation, the method further includes:

The first access point sends a channel sounding announcement frame to the controller or the central access point. The channel sounding announcement frame includes a channel sounding state. The channel sounding state indicates that a channel sounding result is correct, incorrect, or lost.

According to a fifth aspect, a communication apparatus is provided. For example, the communication apparatus is the foregoing second access point or an apparatus disposed in the second access point. The communication apparatus is configured to perform the method according to the first aspect or the possible implementations of the first aspect. Specifically, the communication apparatus may include modules configured to perform the method according to the first aspect or the possible implementations of the first aspect, for example, include a processing module and a transceiver module that are coupled to each other. For example, the communication apparatus is foregoing second access point.

The transceiver module is configured to receive a user association frame from a first access point. The user association frame carries identification information of a first station and is used to determine a first channel sounding result of the first station. The first station is associated with the first access point.

The processing module is configured to determine the first channel sounding result from a plurality of second channel sounding results based on the user association frame. The plurality of second channel sounding results are obtained by the second access point by performing sounding on a plurality of channel sounding frames from a plurality of stations. The channel sounding frame is used for channel sounding.

In a possible implementation, the processing module is further configured to:
after the transceiver module receives a channel sounding instruction from a controller or a central access point, determine the first channel sounding result from the plurality of second channel sounding results. The channel sounding instruction indicates the second access point to perform sounding on the plurality of channel sounding frames. The plurality of stations include the first station, and the first station is not associated with the second access point.

In a possible implementation, the processing module is specifically configured to:
determine at least one second channel sounding result that meets a first preset condition in the plurality of second channel sounding results as the first channel sounding result. The first preset condition is that a difference between a receiving moment of a channel sounding frame corresponding to the second channel sounding result and a receiving moment of a channel sounding frame received by the first access point from the first station falls within a first preset range.

In a possible implementation, the processing module is further configured to:
determine, based on packet length information, the first channel sounding result from the at least one second channel sounding result that meets the first preset condition, where the packet length information indicates a length of the channel sounding frame sent by the first station to the first access point, and the packet length information is carried in the user association frame; and/or
determine, based on packet fingerprint information, the first channel sounding result from the at least one second channel sounding result that meets the first preset condition, where the packet fingerprint information indicates length information of a channel sounding frame sent by the first station to the first access point, and the packet fingerprint information is carried in the user association frame.

In a possible implementation, the processing module is specifically configured to:
determine a second channel sounding result that meets a second preset condition in the at least one second channel sounding result that meets the first preset condition as the first channel sounding result. The second preset condition is that a packet length of the channel sounding frame corresponding to the second channel sounding result and a packet length of the channel sounding frame received by the first access point from the first station are the same or have a minimum difference.

In a possible implementation, the processing module is specifically configured to:
determine a second channel sounding result that meets a third preset condition in the at least one second channel sounding result that meets the first preset condition as the first channel sounding result. The third preset condition is that packet fingerprint information of the channel sounding frame corresponding to the second channel sounding result is the same as the packet fingerprint information.

In a possible implementation, the processing module is further configured to:
perform timing synchronization with the first access point.

According to a sixth aspect, a communication apparatus is provided. For example, the communication apparatus is the foregoing first access point or an apparatus disposed in the first access point. The communication apparatus is configured to perform the method according to the second aspect or the possible implementations of the second aspect. Specifically, the communication apparatus may include modules configured to perform the method according to the second aspect or the possible implementations of the second aspect, for example, include a processing module and a transceiver module that are coupled to each other. For example, the communication apparatus is foregoing first access point.

A processing module is configured to perform channel sounding on a channel sounding frame sent by a first station. The channel sounding frame is used for channel sounding, and the first station is associated with the first access point.

A transceiver module is configured to send a user association frame to a second access point. The user association frame carries identification information of the first station, and is used to determine a first channel sounding result that matches the first station from a plurality of second channel sounding results. The plurality of second channel sounding results are obtained by the second access point by performing sounding on a plurality of channel sounding frames from a plurality of stations. The plurality of stations include the first station, and the first station is not associated with the second access point.

In a possible implementation, the transceiver module is specifically configured to:
receive a channel sounding instruction from a controller or a central access point, and send the user association frame to the second access point. The channel sounding instruction indicates the first access point to perform channel sounding and send the user association frame to the second access point.

In a possible implementation, the user association frame carries a first receiving moment. The first receiving moment is a receiving moment at which the first access point receives the channel sounding frame sent by the first station. The first receiving moment is determined based on a system time point of the first access point. The system time point of the first access point is synchronized with a system time point of the second access point.

In a possible implementation, the user association frame further includes packet length information and/or packet fingerprint information. The packet length information indicates a length of the channel sounding frame received by the first access point from the first station. The packet fingerprint information includes the packet length information.

In a possible implementation, the packet length information is determined based on information carried in a signal field in a PPDU. The channel sounding frame is carried in the PPDU.

Alternatively, the packet length information is determined based on a difference of moments indicated by a physical layer receive end indication PHY-RXEND.indication and a physical layer receive start indication PHY-RXSTART.indication that are received by a MAC layer.

Alternatively, the packet length information is determined based on a start moment and an end moment of a CCA during reception of the channel sounding frame sent by the first station.

In a possible implementation, the channel sounding frame received by the first access point from the first station is carried in a PPDU. The packet fingerprint information is determined based on information carried in a signal field in the PPDU.

In a possible implementation, the transceiver module is further configured to:
  send a channel sounding announcement frame to the controller or the central access point. The channel sounding announcement frame includes a channel sounding state. The channel sounding state indicates that a channel sounding result is correct, incorrect, or lost.

According to a seventh aspect, a communication apparatus is provided. For example, the communication apparatus is the foregoing second access point or an apparatus disposed in the second access point. The communication apparatus is configured to perform the method according to the first aspect or the possible implementations of the first aspect. Specifically, the communication apparatus may include modules configured to perform the method according to the first aspect or the possible implementations of the first aspect, for example, include a processing module and a transceiver module that are coupled to each other. For example, the communication apparatus is foregoing second access point.

The transceiver module is configured to receive a user association frame from a first access point. The user association frame carries identification information of a first station and is used to determine a signal quality sounding result of the first station. The first station is associated with the first access point. The signal quality is determined based on an RSS or an RSSI.

The processing module is configured to determine a first signal quality sounding result that matches the first station from a plurality of second signal quality sounding results based on the user association frame. The plurality of second signal quality sounding results are obtained by the second access point by performing sounding on a plurality of signal sounding frames from a plurality of stations.

In a possible implementation, the transceiver module is specifically configured to:
  receive a channel sounding instruction from a controller or a central access point, and determines the first signal quality sounding result from the plurality of second signal quality sounding results. The channel sounding instruction indicates the second access point to perform sounding on the plurality of signal sounding frames. The plurality of stations include the first station, and the first station is not associated with the second access point.

In a possible implementation, the processing module is specifically configured to:
  determine at least one second signal quality sounding result that meets a first preset condition in the plurality of second signal quality sounding results as the first signal quality sounding result. The first preset condition is that a difference between a receiving moment of a signal sounding frame corresponding to the second signal quality sounding result and a receiving moment of a signal sounding frame received by the first access point from the first station falls within a first preset range.

In a possible implementation, the processing module is further configured to:
  determine, based on packet length information, the first signal quality sounding result from the at least one second signal quality sounding result that meets the first preset condition, where the packet length information indicates a length of the signal sounding frame sent by the first station to the first access point, and the packet length information is carried in the user association frame; and/or
  determine, based on packet fingerprint information, the first signal quality sounding result from the at least one second signal quality sounding result that meets the first preset condition, where the packet fingerprint information indicates length information of a signal sounding frame sent by the first station to the first access point, and the packet fingerprint information is carried in the user association frame.

In a possible implementation, the processing module is specifically configured to:
  determine a second signal quality sounding result that meets a second preset condition in the at least one second signal quality sounding result that meets the first preset condition as the first signal quality sounding result. The second preset condition is that a packet length of the signal sounding frame corresponding to the second signal quality sounding result and a packet length of the signal sounding frame received by the first access point from the first station are the same or have a minimum difference.

In a possible implementation, the processing module is specifically configured to:
  determine a second signal quality sounding result that meets a third preset condition in the at least one second signal quality sounding result that meets the first preset condition as the first signal quality sounding result. The third preset condition is that packet fingerprint information of the signal sounding frame corresponding to the second signal quality sounding result is the same as the packet fingerprint information.

In a possible implementation, the processing module is further configured to:
  perform timing synchronization with the first access point.

According to an eighth aspect, a communication apparatus is provided. For example, the communication apparatus is the foregoing first access point or an apparatus disposed in the first access point. The communication apparatus is configured to perform the method according to the second aspect or the possible implementations of the second aspect. Specifically, the communication apparatus may include modules configured to perform the method according to the second aspect or the possible implementations of the second aspect, for example, include a processing module and a transceiver module that are coupled to each other. For example, the communication apparatus is foregoing first access point.

The processing module is configured to perform channel sounding on a first signal sent by a first station. The first signal is used for RSS or RSSI sounding, and the first station is associated with the first access point.

The transceiver module is configured to send a user association frame to a second access point. The user association frame carries identification information of the first station, and is used to determine a first signal quality sounding result that matches the first station from a plurality of second signal quality sounding results. The plurality of second signal quality sounding results are obtained by the second access point by performing sounding on a plurality of first signals from a plurality of stations. The plurality of stations include the first station, and the first station is not associated with the second access point.

In a possible implementation, the transceiver module is specifically configured to:
  receive a channel sounding instruction from a controller or a central access point, and send the user association frame to the second access point. The channel sounding instruction indicates the first access point to perform sounding on a received signal sounding frame and send the user association frame to the second access point.

In a possible implementation, the user association frame carries a first receiving moment. The first receiving moment is a receiving moment at which the first access point receives the signal sounding frame sent by the first station. The first receiving moment is determined based on a system time point of the first access point. The system time point of the first access point is synchronized with a system time point of the second access point.

In a possible implementation, the user association frame further includes packet length information and/or packet fingerprint information. The packet length information indicates a length of the signal sounding frame received by the first access point from the first station. The packet fingerprint information includes the packet length information.

In a possible implementation, the packet length information is determined based on information carried in a signal field in a PPDU. The signal sounding frame is carried in the PPDU.

Alternatively, the packet length information is determined based on a difference of moments indicated by a physical layer receive end indication PHY-RXEND.indication and a physical layer receive start indication PHY-RXSTART.indication that are received by a MAC layer.

Alternatively, the packet length information is determined based on a start moment and an end moment of a CCA during reception of the signal sounding frame sent by the first station.

In a possible implementation, the signal sounding frame received by the first access point from the first station is carried in a PPDU. The packet fingerprint information is determined based on information carried in a signal field in the PPDU.

In a possible implementation, the transceiver module is further configured to:
  send a signal quality sounding announcement frame to the controller or the central access point. The signal quality announcement frame includes a signal quality sounding state. The signal quality sounding state indicates that signal quality is correct, incorrect, or lost.

According to a ninth aspect, still another communication apparatus is provided. For example, the communication apparatus is the foregoing second access point or an apparatus disposed in the second access point. For example, the communication apparatus is a chip disposed in the second access point. The communication apparatus includes a processor and a transceiver, configured to implement the method according to the first aspect or the possible implementations of the first aspect. For example, the transceiver is implemented by using an antenna, a feeder, and a codec in the second access point. Alternatively, if the fourth communication apparatus is the chip disposed in the second access point, the transceiver is, for example, a communication interface in the chip. The communication interface is connected to a radio frequency transceiver component in the second access point, to receive and send information by using the radio frequency transceiver component.

In some embodiments, the transceiver is configured to receive a user association frame from a first access point. The user association frame carries identification information of a first station and is used to determine a signal quality sounding result of the first station. The first station is associated with the first access point. The signal quality is determined based on an RSS or an RSSI.

The processor is configured to determine a first signal quality sounding result that matches the first station from a plurality of second signal quality sounding results based on the user association frame. The plurality of second signal quality sounding results are obtained by the second access point by performing sounding on a plurality of signal sounding frames from a plurality of stations.

In a possible implementation, the transceiver is specifically configured to:
  receive a channel sounding instruction from a controller or a central access point, and determines the first signal quality sounding result from the plurality of second signal quality sounding results. The channel sounding instruction indicates the second access point to perform sounding on the plurality of signal sounding frames. The plurality of stations include the first station, and the first station is not associated with the second access point.

In a possible implementation, the processor is specifically configured to:
  determine at least one second signal quality sounding result that meets a first preset condition in the plurality of second signal quality sounding results as the first signal quality sounding result. The first preset condition is that a difference between a receiving moment of a signal sounding frame corresponding to the second signal quality sounding result and a receiving moment of a signal sounding frame received by the first access point from the first station falls within a first preset range.

In a possible implementation, the processor is further configured to:
  determine, based on packet length information, the first signal quality sounding result from the at least one second signal quality sounding result that meets the first preset condition, where the packet length information indicates a length of the signal sounding frame sent by the first station to the first access point, and the packet length information is carried in the user association frame; and/or
  determine, based on packet fingerprint information, the first signal quality sounding result from the at least one second signal quality sounding result that meets the first preset condition, where the packet fingerprint information indicates length information of a signal sounding frame sent by the first station to the first access point, and the packet fingerprint information is carried in the user association frame.

In a possible implementation, the processor is specifically configured to:
determine a second signal quality sounding result that meets a second preset condition in the at least one second signal quality sounding result that meets the first preset condition as the first signal quality sounding result. The second preset condition is that a packet length of the signal sounding frame corresponding to the second signal quality sounding result and a packet length of the signal sounding frame received by the first access point from the first station are the same or have a minimum difference.

In a possible implementation, the processor is specifically configured to:
determine a second signal quality sounding result that meets a third preset condition in the at least one second signal quality sounding result that meets the first preset condition as the first signal quality sounding result. The third preset condition is that packet fingerprint information of the signal sounding frame corresponding to the second signal quality sounding result is the same as the packet fingerprint information.

In a possible implementation, the processor is further configured to:
perform timing synchronization with the first access point.

In some other embodiments, the transceiver is configured to receive a user association frame from a first access point. The user association frame carries identification information of a first station and is used to determine a signal quality sounding result of the first station. The first station is associated with the first access point. The signal quality is determined based on an RSS or an RSSI. The processor is configured to determine a first signal quality sounding result that matches the first station from a plurality of second signal quality sounding results based on the user association frame. The plurality of second signal quality sounding results are obtained by the second access point by performing sounding on a plurality of signal sounding frames from a plurality of stations.

In a possible implementation, the transceiver is specifically configured to:
receive a channel sounding instruction from a controller or a central access point, and determines the first signal quality sounding result from the plurality of second signal quality sounding results. The channel sounding instruction indicates the second access point to perform sounding on the plurality of signal sounding frames. The plurality of stations include the first station, and the first station is not associated with the second access point.

In a possible implementation, the processor is specifically configured to:
determine at least one second signal quality sounding result that meets a first preset condition in the plurality of second signal quality sounding results as the first signal quality sounding result. The first preset condition is that a difference between a receiving moment of a signal sounding frame corresponding to the second signal quality sounding result and a receiving moment of a signal sounding frame received by the first access point from the first station falls within a first preset range.

In a possible implementation, the processor is further configured to:
determine, based on packet length information, the first signal quality sounding result from the at least one second signal quality sounding result that meets the first preset condition, where the packet length information indicates a length of the signal sounding frame sent by the first station to the first access point, and the packet length information is carried in the user association frame; and/or
determine, based on packet fingerprint information, the first signal quality sounding result from the at least one second signal quality sounding result that meets the first preset condition, where the packet fingerprint information indicates length information of a signal sounding frame sent by the first station to the first access point, and the packet fingerprint information is carried in the user association frame.

In a possible implementation, the processor is specifically configured to:
determine a second signal quality sounding result that meets a second preset condition in the at least one second signal quality sounding result that meets the first preset condition as the first signal quality sounding result. The second preset condition is that a packet length of the signal sounding frame corresponding to the second signal quality sounding result and a packet length of the signal sounding frame received by the first access point from the first station are the same or have a minimum difference.

In a possible implementation, the processor is specifically configured to:
determine a second signal quality sounding result that meets a third preset condition in the at least one second signal quality sounding result that meets the first preset condition as the first signal quality sounding result. The third preset condition is that packet fingerprint information of the signal sounding frame corresponding to the second signal quality sounding result is the same as the packet fingerprint information.

In a possible implementation, the processor is further configured to:
perform timing synchronization with the first access point.

According to a tenth aspect, another communication apparatus is provided. For example, the communication apparatus is the foregoing first access point or an apparatus disposed in the first access point. For example, the communication apparatus is a chip disposed in the first access point. The communication apparatus includes a processor and a transceiver, configured to implement the method according to the second aspect or the possible implementations of the second aspect. For example, the transceiver is implemented by using an antenna, a feeder, and a codec in the first access point. Alternatively, if the fourth communication apparatus is the chip disposed in the first access point, the transceiver is, for example, a communication interface in the chip. The communication interface is connected to a radio frequency transceiver component in the first access point, to receive and send information by using the radio frequency transceiver component.

In some embodiments, the processor is configured to perform channel sounding on a channel sounding frame sent by a first station. The channel sounding frame is used for channel sounding, and the first station is associated with the first access point. The transceiver is configured to send a user association frame to a second access point. The user association frame carries identification information of the first station, and is used to determine a first channel sounding result that matches the first station from a plurality of second channel sounding results. The plurality of second channel sounding results are obtained by the second access point by performing sounding on a plurality of channel sounding frames from a plurality of stations. The plurality of stations include the first station, and the first station is not associated with the second access point.

In a possible implementation, the transceiver is specifically configured to:
receive a channel sounding instruction from a controller or a central access point, and send the user association frame to the second access point. The channel sounding instruction indicates the first access point to perform channel sounding and send the user association frame to the second access point.

In a possible implementation, the user association frame carries a first receiving moment. The first receiving moment is a receiving moment at which the first access point receives the channel sounding frame sent by the first station. The first receiving moment is determined based on a system time point of the first access point. The system time point of the first access point is synchronized with a system time point of the second access point.

In a possible implementation, the user association frame further includes packet length information and/or packet fingerprint information. The packet length information indicates a length of the channel sounding frame received by the first access point from the first station. The packet fingerprint information includes the packet length information.

In a possible implementation, the packet length information is determined based on information carried in a signal field in a PPDU. The channel sounding frame is carried in the PPDU.

Alternatively, the packet length information is determined based on a difference of moments indicated by a physical layer receive end indication PHY-RXEND.indication and a physical layer receive start indication PHY-RXSTART.indication that are received by a MAC layer.

Alternatively, the packet length information is determined based on a start moment and an end moment of a CCA during reception of the channel sounding frame sent by the first station.

In a possible implementation, the channel sounding frame received by the first access point from the first station is carried in a PPDU. The packet fingerprint information is determined based on information carried in a signal field in the PPDU.

In a possible implementation, the transceiver module is further configured to:
send a signal quality sounding announcement frame to the controller or the central access point. The signal quality announcement frame includes a signal quality sounding state. The signal quality sounding state indicates that signal quality is correct, incorrect, or lost.

In some other embodiments, the processor is configured to perform channel sounding on a first signal sent by a first station. The first signal is used for RSS or RSSI sounding, and the first station is associated with the first access point. The transceiver is configured to send a user association frame to a second access point. The user association frame carries identification information of the first station, and is used to determine a first signal quality sounding result that matches the first station from a plurality of second signal quality sounding results. The plurality of second signal quality sounding results are obtained by the second access point by performing sounding on a plurality of first signals from a plurality of stations. The plurality of stations include the first station, and the first station is not associated with the second access point.

In a possible implementation, the transceiver is specifically configured to:
receive a channel sounding instruction from a controller or a central access point, and send the user association frame to the second access point. The channel sounding instruction indicates the first access point to perform sounding on a received signal sounding frame and send the user association frame to the second access point.

In a possible implementation, the user association frame carries a first receiving moment. The first receiving moment is a receiving moment at which the first access point receives the signal sounding frame sent by the first station. The first receiving moment is determined based on a system time point of the first access point. The system time point of the first access point is synchronized with a system time point of the second access point.

In a possible implementation, the user association frame further includes packet length information and/or packet fingerprint information. The packet length information indicates a length of the signal sounding frame received by the first access point from the first station. The packet fingerprint information includes the packet length information.

In a possible implementation, the packet length information is determined based on information carried in a signal field in a PPDU. The signal sounding frame is carried in the PPDU.

Alternatively, the packet length information is determined based on a difference of moments indicated by a physical layer receive end indication PHY-RXEND.indication and a physical layer receive start indication PHY-RXSTART.indication that are received by a MAC layer.

Alternatively, the packet length information is determined based on a start moment and an end moment of a CCA during reception of the signal sounding frame sent by the first station.

In a possible implementation, the signal sounding frame received by the first access point from the first station is carried in a PPDU. The packet fingerprint information is determined based on information carried in a signal field in the PPDU.

In a possible implementation, the transceiver is further configured to:
send a signal quality sounding announcement frame to the controller or the central access point. The signal quality announcement frame includes a signal quality sounding state. The signal quality sounding state indicates that signal quality is correct, incorrect, or lost.

According to an eleventh aspect, still another possible communication apparatus is provided. The communication apparatus may be the first access point in the foregoing method designs. For example, the communication apparatus is a chip disposed in the first access point. The communication apparatus includes a memory configured to store computer-executable program code, and a processor coupled to the memory. The processor is coupled to the memory. The program code stored in the memory includes an instruction. When the processor executes the instruction, the communication apparatus is enabled to perform the method according to the second aspect or the possible implementations of the second aspect.

In some embodiments, the communication apparatus may further include a communication interface. The communication interface may be a transceiver in the first access point.

For example, the transceiver is implemented by using an antenna, a feeder, a codec, and the like in the first access point. Alternatively, if the communication apparatus is a chip disposed in the first access point, the communication interface may be an input/output interface of the chip, for example, an input/output pin.

According to a twelfth aspect, still another communication apparatus is provided. The communication apparatus may be the second access point in the foregoing method designs. For example, the communication apparatus is a chip disposed in the second access point. The communication apparatus includes a memory configured to store computer-executable program code, and a processor coupled to the memory. The processor is coupled to the memory. The program code stored in the memory includes an instruction. When the processor executes the instruction, the communication apparatus is enabled to perform the method according to the first aspect or the possible implementations of the first aspect.

In some embodiments, the communication apparatus may further include a communication interface. The communication interface may be a transceiver in the second access point. For example, the transceiver is implemented by using an antenna, a feeder, a codec, and the like in the second access point. Alternatively, if the communication apparatus is a chip disposed in the second access point, the communication interface may be an input/output interface of the chip, for example, an input/output pin.

According to a thirteenth aspect, a communication system is provided. The communication system may include the communication apparatus according to the fifth aspect, the communication apparatus according to the seventh aspect, or the communication apparatus according to the ninth aspect, and include the communication apparatus according to the sixth aspect, the communication apparatus according to the eighth aspect, or the communication apparatus according to the tenth aspect. It should be understood that the communication system may include more access points and/or stations.

According to a fourteenth aspect, an embodiment of this application provides a chip system. The chip system includes a processor, and may further include a memory, configured to implement the method performed by the second access point in the first aspect or the first access point in the second aspect. The chip system may include a chip, or may include a chip and another discrete component.

According to a fifteenth aspect, an embodiment of this application further provides a computer readable storage medium, including instructions. When the instructions are run on a computer, the computer is enabled to perform the method performed by the second access point in the first aspect or the first access point in the second aspect, to implement a function implemented by the second access point in the first aspect or the first access point in the second aspect.

According to a sixteenth aspect, an embodiment of this application further provides a computer program product. The computer program product stores instructions. When the instructions are run on a computer, the computer is enabled to perform the method performed by the second access point in the first aspect or the first access point in the second aspect, to implement a function implemented by the second access point in the first aspect or the first access point in the second aspect.

For beneficial effects of the fifth aspect to the sixteenth aspect and the implementations thereof, refer to the descriptions of the beneficial effects of the method in the first aspect, the second aspect, the third aspect, or the fourth aspect and the implementations thereof.

DESCRIPTION OF EMBODIMENTS

To make objectives, technical solution, and advantages of embodiments of this application clearer, the following further describes embodiments of this application in detail with reference to the accompanying drawings.

Embodiments of this application may be applied to a wireless local area network (wireless local area network, WLAN) scenario, and may be applied to an IEEE 802.11 system standard, or a next-generation standard or a further next-generation standard. Alternatively, embodiments of this application may be applied to a wireless local area network system, for example, an internet of things (IoT) or a vehicle-to-everything (Vehicle to X, V2X) network. Certainly, embodiments of this application may be further applied to another possible communication system, for example, a long term evolution (LTE) system, an LTE frequency division duplex (FDD) system, time division duplex (TDD), a universal mobile telecommunication system (UMTS), a worldwide interoperability for microwave access (WiMAX) communication system, and a future 5G communication system.

Figure 1:
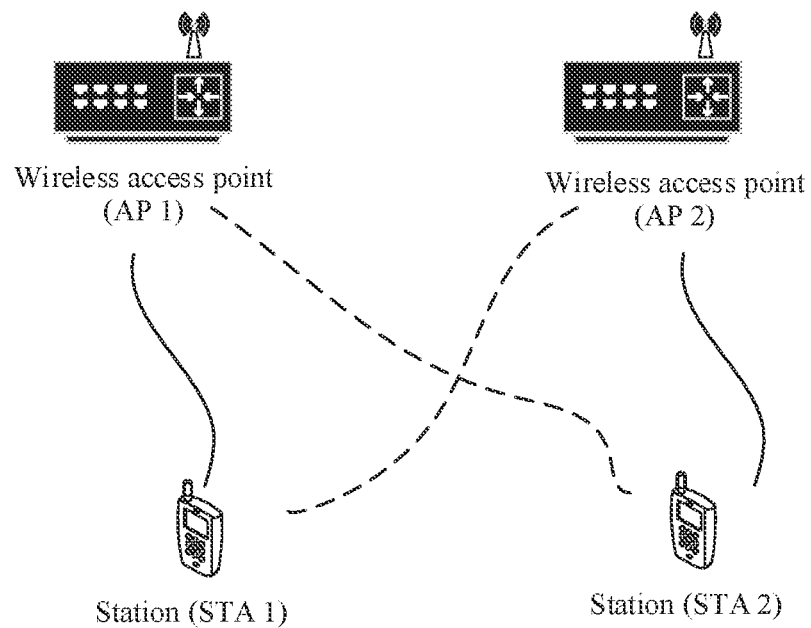
FIG. 1 shows a network architecture of a wireless local area network to which an embodiment of this application is applicable.

For example, FIG. 1 is a diagram of a network architecture of a WLAN to which an embodiment of this application is applicable. FIG. 1 shows an example in which the WLAN includes two APs (an AP 1 and an AP 2), a STA 1 associated with the AP 1, and a STA 2 associated with the AP 2. It should be understood that a STA associated with an AP, namely, the STA connected to the AP can receive a radio frame sent by the AP, and can also send a radio frame to the AP. Accordingly, a STA that is not associated or is non-associated with an AP, namely, the STA not connected to the AP, cannot directly send the radio frame to the AP, and cannot directly receive the radio frame sent by the AP. Alternatively, the STA can send the radio frame to the AP, but the AP cannot correctly parse the received radio frame.

In FIG. because the STA 1 is associated with the AP 1 and is not associated with the AP 2. To distinguish this association, in FIG. 1, a solid line indicates an association between the STA 1 and the AP 1, and a dashed line indicates a non-association between the STA 1 and the AP 2. Similarly, a solid line indicates an association between the STA 2 and the AP 2, and a dashed line indicates an association between the STA 2 and the AP 1. It should be noted that a quantity of APs and a quantity of STAs in FIG. 1 are merely an example. There may be more or less APs and STAs. For example, in addition to the STA 1, a STA associated with the AP 1 may further include another STA. In addition to the STA 2, a STA associated with the AP 2 may further include another STA. For another example, the WLAN shown in FIG. 1 may further include more APs. This embodiment of this application is also applicable to communication between APs. For example, the APs can communicate with each other through a distributed system (distributed system, DS), and any AP can communicate with a STA associated with the AP and/or a STA not associated with the AP. This embodiment of this application is also applicable to communication between STAs.

The station STA in this embodiment of this application may be various user terminals, user apparatuses, access apparatuses, subscriber stations, subscriber units, mobile stations, user agents, user equipment, or the like in another name that have a wireless communication function. The user terminal may include various handheld devices, vehicle-mounted devices, wearable devices, computing devices, or other processing devices connected to a wireless modem that have a wireless communication function; and various forms of user equipment (UE), mobile stations (MS), terminals, terminal equipment, portable communication devices, handheld devices, portable computing devices, entertainment devices, game devices or systems, global positioning system devices or any other proper devices configured to perform network communication by using a wireless medium, and the like. Herein, for ease of description, the devices mentioned above are collectively referred to as stations or STAs. The access point AP in embodiments of this application is an apparatus that is deployed in a wireless communication network and that provides a wireless communication function for a STA associated with the access point AP. The access point AP may be used as a hub of the communication system, and may be a communication device such as a base station, a router, a gateway, a repeater, a communication server, a switch, or a bridge. The base station may include various forms of macro base stations, micro base stations, relay stations, and the like. Herein, for ease of description, the devices mentioned above are collectively referred to as access points APs.

The AP and the STA in some embodiments of this application may be an AP and a STA to which an IEEE 802.11 system standard is applicable. For example, the STA is usually a terminal product that supports media access control (MAC) and a physical layer (physical, PHY) of the 802.11 system standard, for example, a mobile phone or a notebook computer. The AP is usually a network side product that supports MAC and PHY in the 802.11 system standard, for example, a router or a repeater.

The AP may allocate a resource to the STA. The STA performs data transmission on the allocated resource. The 802.11 standard supports inter-frequency deployment of adjacent APs. In other words, different center frequencies of frequency band resources are allocated to adjacent APs (which may also be considered that different frequency band resources are allocated to the adjacent APs), and data is transmitted on the allocated resources. However, if a wide frequency band resource is allocated to an AP, there is no sufficient resource for inter-frequency deployment of all APs. As a result, a plurality of APs are deployed on a same frequency. Intra-frequency deployment means that resources allocated to the adjacent APs partially or completely overlap. When the plurality of APs are deployed, a physical space distance between them needs to meet a specific distance, to avoid interference to data transmission of the plurality of APs. Alternatively, the plurality of APs need to perform data transmission on the allocated resources according to the CSMA/CA protocol. In other words, only one AP can perform data transmission at a same moment.

Figure 2:
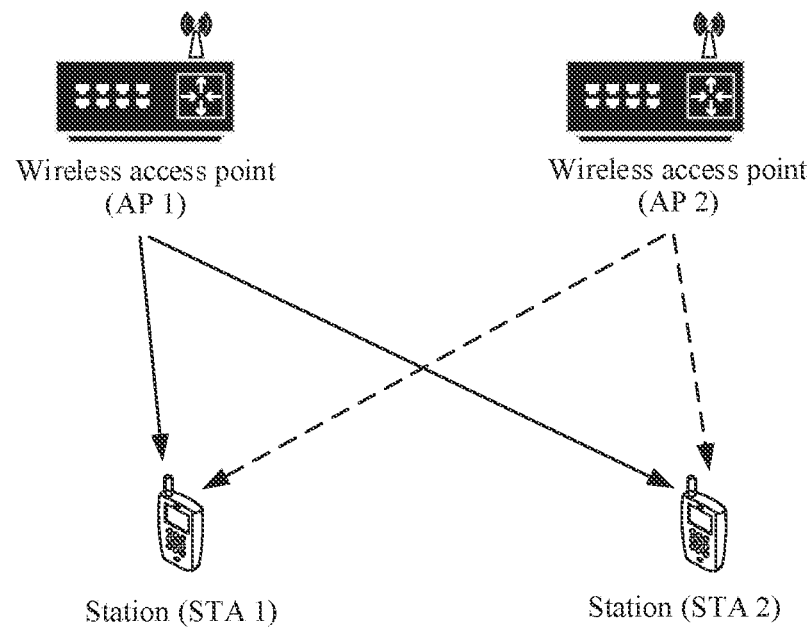
FIG. 2 is a schematic diagram of data transmission performed by a plurality of intra-frequency deployed APs according to an embodiment of this application.

For ease of understanding, refer to FIG. 2. FIG. 2 is a schematic diagram of data transmission performed by an AP 1 and an AP 2 that are intra-frequency deployed. The AP 1 and AP 2 that are intra-frequency deployed means that only the AP 1 or the AP 2 can send a packet. It may also be understood that although both the AP 1 and the AP 2 send packets, the AP 2 cannot communicate with a STA 2, because radio channel energy sent by the AP 1 covers the STA 2. Similarly, radio channel energy sent by the AP 2 covers a STA 1. As a result, the AP 1 cannot communicate with the STA 2. In FIG. 2, solid lines indicate that the AP communicates with the STA, and dashed lines indicate that the AP cannot communicate with the STA, FIG. 2 shows an example in which the AP 1 communicates with the SAT 1 and the STA, and the AP 2 does not communicate with the STA 1 and the STA 2.

To improve a network transmission rate, the AP 1 and AP 2 may be allowed to concurrently send data. However, it needs to be ensured that the STA 1 is not interfered by a signal sent by the AP 2, and the STA 2 is not interfered by a signal sent by the AP 1. In some embodiments, interference between the AP 1 and the AP 2 may be prevented in an interference nulling mode. Interference nulling means that the AP (the AP 1) obtains a channel state of a STA (the STA 1) associated with the AP (the AP 1) and a channel state of a STA (the STA 2) associated with another intra-frequency AP (the AP 2), and cancels interference from the STA 2 through precoding, so that the AP 1 and the AP 2 can concurrently transmit data without interfering with each other. In this way, the AP 1 and the AP 2 can concurrently transmit data, and a transmission rate of an entire network can be improved.

Figure 3:
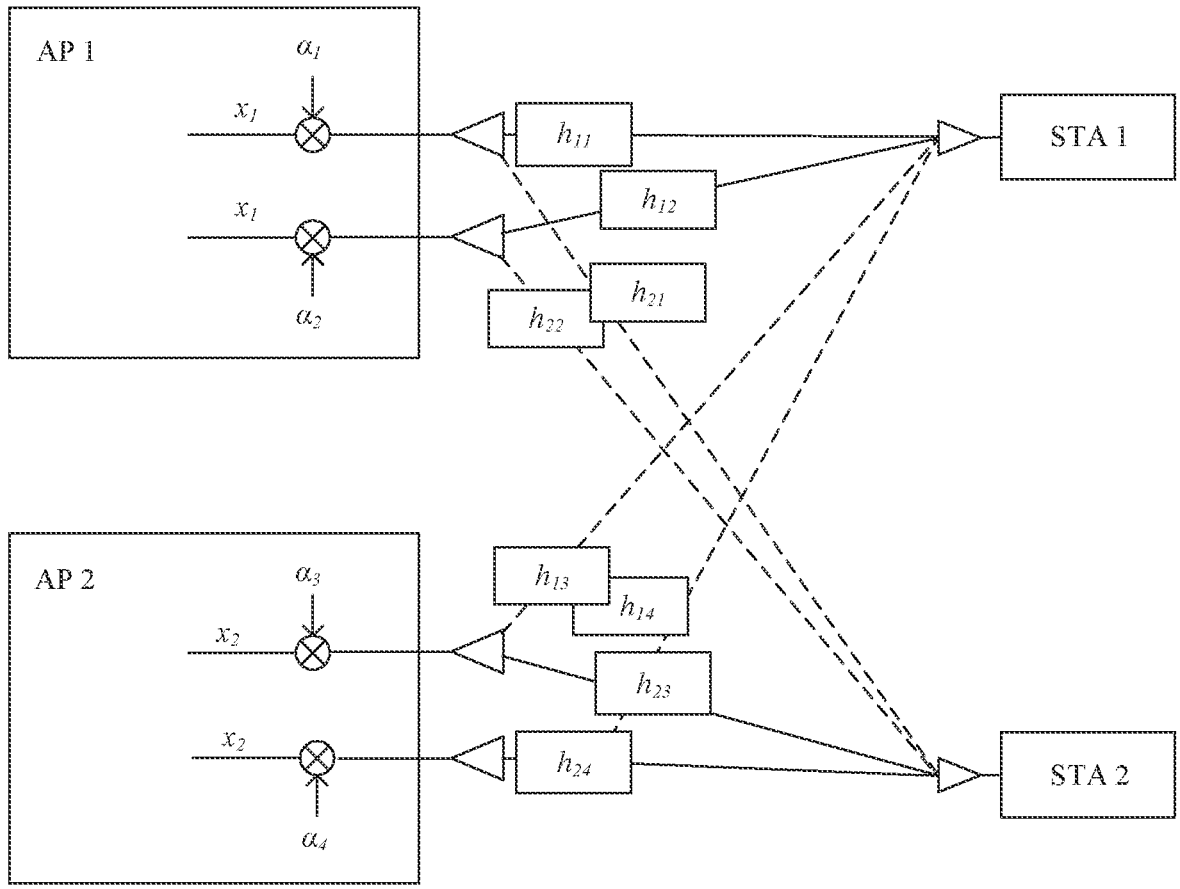
FIG. 3 is a schematic diagram of data transmission performed by a plurality of intra-frequency deployed APs through interference nulling according to an embodiment of this application.

For ease of understanding, the following uses FIG. 3 as an example to describe a specific principle of interference nulling. FIG. 3 shows an example in which two adjacent intra-frequency APs are an AP 1 and an AP 2. A STA associated with the AP 1 is a STA 1, and a STA associated with the AP 2 is a STA 2. When the AP 1 and the AP 2 separately send data to the STAs associated with the AP 1 and the AP 2, because a radio channel is transmitted, both the STA 1 and the STA 2 receive the data from the AP 1 and the AP 2. In this case, mutual interference is likely to occur, in other words, the STA 1 and the STA 2 cannot normally receive the data of the APs associated with the STA 1.

It is assumed that a signal received by the STA 1 may be denoted as:

$$y_1 \alpha_1 h_{11} x_1 + \alpha_2 h_{12} x_1 + \alpha_3 h_{13} x_2 + \alpha_4 h_{14} x_2 \qquad (1);$$

$y_1$ is a signal received by the STA 1, $\alpha_1$ and $\alpha_2$ respectively indicate precoding coefficients of an AP 1, $\alpha_3$ and $\alpha_4$ respectively indicate precoding coefficients of an AP 2, $h_{11}$ and $h_{12}$ are channels between the AP 1 and the STA 1, $h_{13}$ and $h_{14}$ are channels between the AP 2 and a STA 2, $x_1$ indicates to-be-sent data of the AP 1, and $x_2$ indicates to-be-sent data of the AP 2.

If $\alpha_3 h_{13} x_2 + \alpha_4 h_{14} x_2 = 0$ in formula (1), in other words, $$\alpha_3 = -\frac{h_{14}}{h_{13}} \alpha_4,$$

a requirement of interference nulling can be met, to be specific, the signal $y_1$ received by the AP 1 is not interfered by channels $h_{13}$ and $h_{14}$.

Similarly, it is assumed that a signal received by the STA 2 may be denoted as:

$$y_2 \alpha_1 h_{21} x_1 + \alpha_2 h_{22} x_1 + \alpha_3 h_{23} x_2 + \alpha_4 h_{24} x_2 \qquad (2);$$

$y_2$ is a signal received by the STA 2, $\alpha_1$ and $\alpha_2$ respectively indicate precoding coefficients of an AP 1, $\alpha_3$ and $\alpha_4$ respectively indicate precoding coefficients of an AP 2, $h_{21}$ and $h_{22}$ are channels between the AP 1 and the STA 2, $h_{23}$ and $h_{24}$ are channels between the AP 2 and a STA 2, $x_1$ indicates to-be-sent data of the AP 1, and $x_2$ indicates to-be-sent data of the AP 2.

If $\alpha_1 h_{21} x_1 + \alpha_2 h_{22} x_1 = 0$ in formula (1), in other words, $$\alpha_1 = -\frac{h_{21}}{h_{22}} \alpha_2,$$

a requirement of interference nulling can be met, to be specific, the signal $y_2$ received by the AP 2 is not interfered by channels $h_{21}$ and $h_{22}$.

It can be learned that to prevent mutual interference between a plurality of intra-frequency deployed APs in an interference nulling mode, channel sounding needs to be performed across APs. To be specific, each AP in the plurality of intra-frequency deployed APs not only needs to obtain a channel of a STA associated with the AP, but also needs to obtain a channel of a STA not associated with the AP.

The 802.11 standard supports explicit channel sounding and implicit channel sounding (which may also be referred to as transparent channel sounding). Explicit channel sounding means that the AP sends a channel sounding frame to the STA, and the STA performs sounding on the channel sounding frame, and sends an obtained channel sounding result to the AP. Implicit channel sounding means that the AP performs channel sounding on a channel sounding frame (for example, a PPDU packet), reported by the STA associated with the AP, and the STA does not perform channel sounding. This specification mainly focuses on implicit channel sounding. Therefore, explicit channel sounding is not further described herein.

Figure 4:
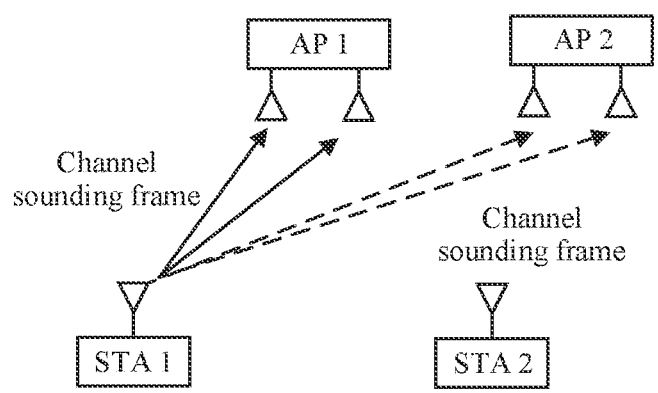
FIG. 4 is a schematic flowchart of implicit channel sounding according to an embodiment of this application.
Figure 5:
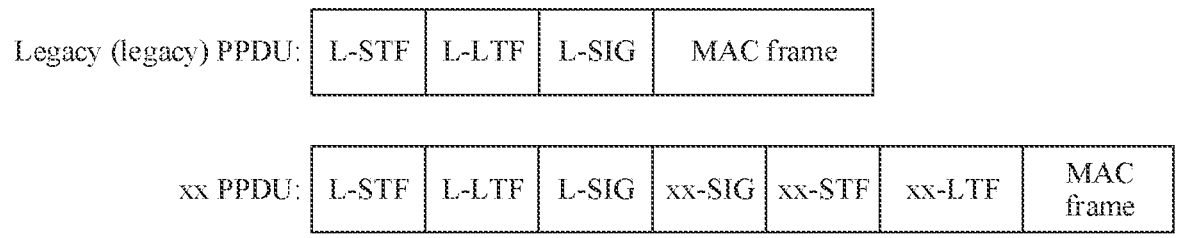
FIG. 5 is a schematic diagram of a structure of a channel sounding frame according to an embodiment of this application.

FIG. 4 shows a schematic flowchart of implicit channel sounding. This specification uses an example in which the channel sounding frame reported by the STA to the AP is carried in a PPDU. From this perspective, the channel sounding frame may also be referred to as the PPDU packet. Before an implicit channel sounding process is described, the following describes a structure of the PPDU packet. The PPDU packet may include a short training field, a long training field, a signal field, a media access control (MAC) frame (frame) field, and the like. For example, FIG. 5 is a schematic diagram of a structure of a legacy PPDU and an xx PPDU. The xx PPDU means high throughput (HT), very high throughput (VHT), high efficiency (HE) PPDUs in the 802.11 standard, and a PPDU in the subsequent standard. The legacy PPDU may include a legacy short training field (L-STF), a legacy long training field (L-LTF), a legacy signal field (L-STG), and a MAC frame field. Iit should be understood that the xx-LTF, the xx-STF, and the xx-SIG respectively mean a short training field, a long training field, and a signal field that are defined as the HT, the VHT, the HE in the 802.11 and subsequent standard. The MAC frame field may be used to carry identification information of the STA, for example, a MAC address of the STA.

The STA 1 may send a PPDU packet, and the AP 1 receives and parses the PPDU packet. The AP 1 may perform channel estimation, to be specific, perform channel sounding by using a low-order modulation scheme in the PPDU packet, for example, an LTF sequence and a SIG field of binary phase shift keying (BPSK) or quadrature phase shift keying (QPSK). Then, the AP 1 parses a MAC frame modulated by using a high-order modulation and coding scheme (MCS), to determine a specific STA from which the PPDU is sent, and complete sounding on a channel from the STA to the AP. Similar to the AP 1, the AP 2 may perform channel sounding in a similar manner.

If a plurality of intra-frequency deployed APs exists in a network, for example, the AP 2 and the AP 1 are intra-frequency deployed as shown FIG. 4. The STA 1 is associated with the AP 1, and the STA 2 is associated with the AP 2. Generally, the STA 1 is close to the AP 1 and far from the AP 2. When sending the PPDU packet, the STA 1 preferably determines a modulation and coding scheme (MCS) modulation rate in a MAC frame in the PPDU packet based on quality of a channel between the STA 1 and the AP 1, without considering quality of a channel between the STA 1 and the AP 2. In this way, when the STA 1 sends the MAC frame at a high MCS modulation rate, the AP 2 cannot correctly parse content of the MAC frame in the PPDU packet, in other words, cannot determine a specific STA that sends the PPDU packet. In other words, the AP 2 can perform sounding on a channel state only based on low-order modulated L-LTF/xx-LTF and L-SIG/xx-SIG in the PPDU packet, and cannot determine a specific STA corresponding to the channel.

In addition, a radio frame is spatially sent. Therefore, to prevent an unnecessary frame from being received and avoid increasing packet processing workload of a receive end, in some embodiments, a source address and destination address filtering mechanism is used at a MAC layer of the AP. In other words, the receive end filters out a packet that does not belong to the receive end. For example, the STA 1 is not associated with the AP 2. Therefore, the AP 2 considers that the PPDU packet from the STA 1 does not belong to the AP 2. According to the filtering mechanism, the AP 2 does not parse the MAC frame in the PPDU packet sent by the STA 1. As a result, the AP 2 cannot determine a specific STA to which the channel belongs.

It can be learned that in a scenario of a plurality of intra-frequency deployed APs, a single-AP implicit channel sounding method is still used, and channel sounding cannot be performed across APs, in other words, the AP 2 cannot perform channel sounding on the STA 1 associated with the AP 1.

It should be noted that RSS or RSSI sounding is also performed across APs during RSS or RSSI sounding. Similarly, the AP 2 cannot perform RSS or RSSI sounding on a signal sent by the STA 1 associated with the AP 1.

Therefore, an embodiment of this application provides a channel sounding method. In the method, the AP 1 may perform sounding on a channel sounding frame reported by a STA associated with the AP 1, and the AP 2 may also perform sounding on received channel sounding frames reported by a plurality of STAs. After performing sounding on the channel sounding frame reported by the STA associated with the AP 1, the AP 1 may send, to the AP 2, a user association frame that carries identification information of the STA. The AP 2 may determine a channel sounding result of the STA from a plurality of obtained channel sounding results based on the identification information of the STA carried in the user association frame. In other words, channel sounding is performed across APs.

The technical solutions provided in this embodiment of this application may be applied to the wireless communication system shown in FIG. 1, for example, a 5G system, a further evolved system based on LTE or NR, a future wireless communication system, another similar communication system, or the like. In addition, the technical solutions provided in this embodiment of this application may be used for channel sounding on the STA, and may also be used for RSS or RSSI sounding. It should be understood that when the technical solution is used for RSS or RSSI sounding, the channel sounding method provided in this embodiment of this application may also be referred to as a signal quality sounding method. If no conflict occurs, channel sounding in this embodiment of this application may be replaced with RSS or RSSI sounding. The fallowing uses an example in which the technical solution is applied to channel sounding. The technical solutions provided in this embodiment of this application are described below in detail with reference to the accompanying drawings.

The technical solutions provided in this embodiment of this application are described below in detail with reference to the accompanying drawings.

Figure 6:
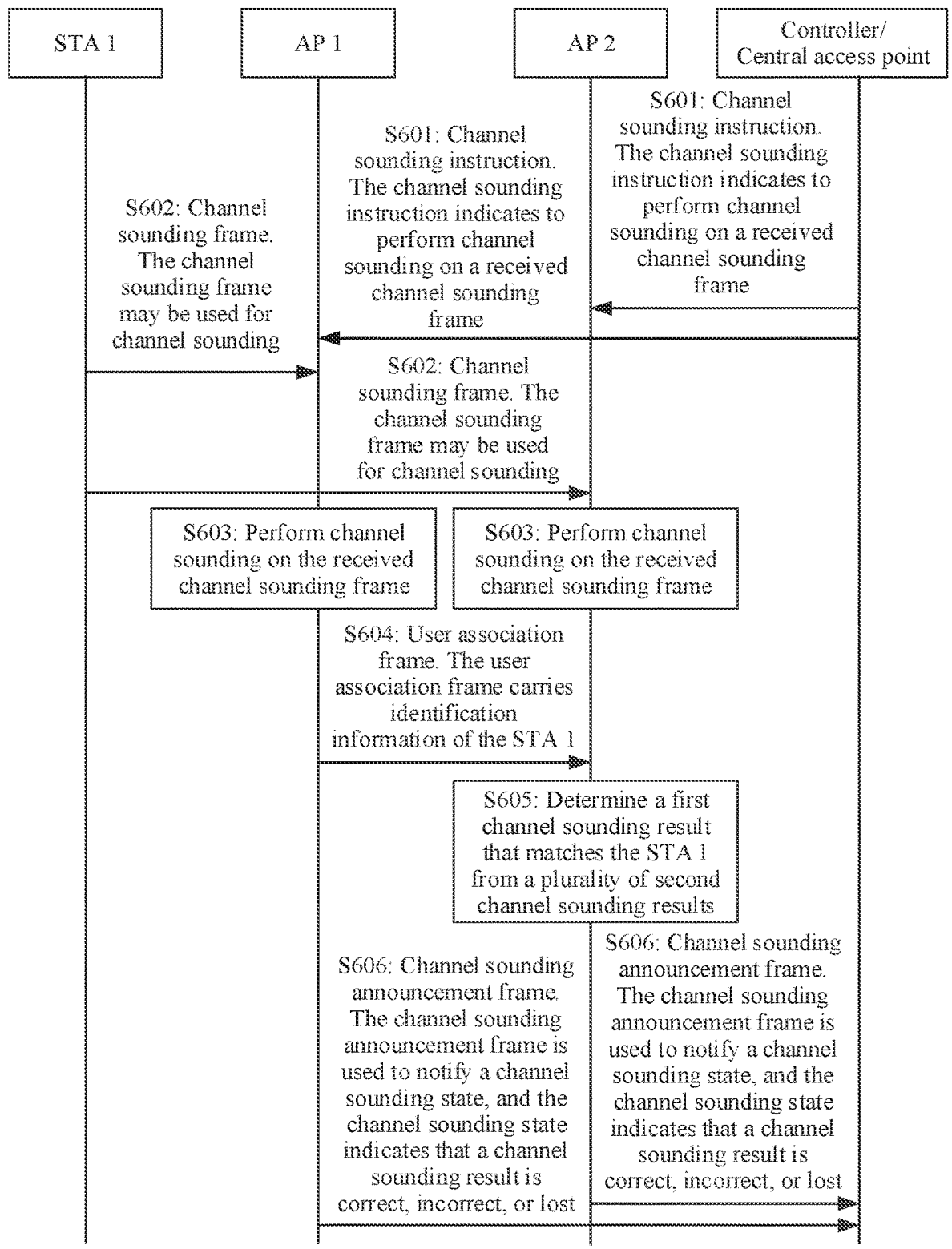
FIG. 6 is a schematic flowchart of a channel sounding method according to an embodiment of this application.

FIG. 6 shows a channel sounding method according to an embodiment of this application. The following description uses an example in which the method provided in this embodiment of this application is applied to the application scenario shown in FIG. 1. In addition, the method may be executed by two communication apparatuses. The two communication apparatuses are, for example, a first access point (denoted as an AP 1 below) and a second access point (denoted as an AP 2 below). It should be noted that the method is also applicable to a network including at least three APs. A specific quantity of APs is not limited in this embodiment of this application. Each AP may be associated with one STA, or may be associated with a plurality of STAs. The following uses an example in which the AP 1 is associated with one STA (denoted as a STA 1 below) and the AP 2 is associated with one STA (denoted as a STA 2 below). It should be understood that the STA 1 is not associated with the AP 2. Similarly, the STA 2 is not associated with the AP 1.

Specifically, a procedure of the channel sounding method according to this embodiment of this application is described as follows.

S601: A controller sends channel sounding instructions to the AP 1 and the AP 2. The channel sounding instruction indicates to perform channel sounding on a received channel sounding frame.

In this embodiment of this application, the controller may be responsible for coordinating a plurality of APs to perform channel sounding, data transmission, and the like. The controller may be connected to one or more APs through a network cable or an optical fiber, or the controller may be wirelessly connected to one or more APs. In some embodiments, the controller may be disposed in the AP and used as a functional module of the AP. For example, the controller may be disposed in the AP 1, and interaction between the controller and the AP 1 may be considered as internal channel exchange. The controller is disposed in the AP 1, and may also be considered as a central access point of the AP 1. Certainly, the controller may alternatively be independent of the AP 1. Specific implementation of the controller is not limited in this embodiment of this application.

During channel sounding, any STA sends a channel sounding frame, and a plurality of APs separately receive the channel sounding frame, and measure the channel sounding frame, to obtain channel sounding results. It should be understood that there are a plurality of APs (for example, including the AP 1 and the AP 2) and a plurality of STAs in a network. For example, a plurality of STAs are associated with the AP 1, and a plurality of STAs are also associated with the AP 2. The AP 1 and the AP 2 may receive PPDU packets sent by a plurality of STAs, to obtain a plurality of channel sounding results.

In this embodiment of this application, the channel sounding frame may be a dedicated frame used for channel sounding, for example, an NDP frame, or may reuse a data frame or a control frame with another function. A specific implementation of the channel sounding frame is not limited in this embodiment of this application, provided that the channel sounding frame can be used for channel sounding. The following uses an example in which the channel sounding frame is the PPDU packet shown in FIG. 5. During channel sounding, any STA may send a PPDU packet used for channel sounding. The following description uses an example in which the STA 1 sends the PPDU packet.

For example, the STA 1 sends the PPDU packet, and both the AP 1 and the AP 2 may perform channel sounding on the PPDU packet. The STA 1 is associated with the AP 1 and is not associated with the AP 2. Therefore, in some embodiments, the AP 2 considers that the PPDU packet from the STA 1 does not belong to the AP 2 and does not parse the MAC frame in the PPDU packet. As a result, the AP 2 cannot determine a specific STA from which the PPDU packet is sent. In other words, the AP 2 cannot determine, from a plurality of obtained channel sounding results, a specific channel sounding result that is a channel sounding result of the STA 1. In some other embodiments, even if the AP 2 parses the PPDU packet, because the STA 1 is associated with the AP 1 but is not associated with the AP 2, an MCS modulation rate in the PPDU packet matches the AP 1. The AP 1 can correctly parse identification information of the STA 1 in the PPDU packet, but the AP 2 cannot correctly parse the identification information of the STA 1 in the PPDU packet. In other words, the AP 2 still cannot obtain the channel sounding result of the STA 1 from the obtained plurality of channel sounding results. Similarly, the AP 1 cannot directly obtain a channel sounding result of the STA 2 from the STA 2.

However, in this embodiment of this application, when the AP 2 needs to obtain the channel sounding result of the STA 1 associated with the AP 1, the controller may indicate the AP 2 to perform channel sounding on the PPDU packet from the STA 1, and indicate the AP 1 to notify the AP 2 of association information associated with the channel sounding result of the STA 1, for example, the identification information of the STA 1. In this way, the AP 2 may determine the channel sounding result of the STA 1 from a plurality of obtained channel sounding results based on the association information. In other words, only after receiving a channel sounding instruction, the AP 2 performs channel sounding on the PPDU packet sent by the STA 1 not associated with the AP 2; if no channel sounding instruction is received, the AP 2 does not perform channel sounding on the STA 1 not associated with the AP 2. Similarly, the AP 2 may also notify the AP 1 of information associated with the channel sounding result of the STA 2. In this way, the AP 1 may determine the channel sounding result of the STA 2 from a plurality of obtained channel sounding results based on the association information.

For example, the controller may send a channel sounding instruction to the AP 1. The channel sounding instruction indicates to perform channel sounding on a received channel sounding frame, and send the channel sounding result of the STA 1 associated with the AP 1 to the AP 2. It should be understood that the controller may send the channel sounding instruction to the AP 2, where the channel sounding instruction indicates to perform channel sounding on a received channel sounding frame, and send the channel sounding result of the STA 2 associated with the AP 2 to the AP 1. It should be noted that the channel sounding instruction may also be referred to as a channel sounding command, and a format of the channel sounding command in the 802.11 standard may still be used. Because the channel sounding instruction is used for implicit channel sounding, in some embodiments, the channel sounding instruction may be referred to as an implicit channel sounding instruction or a transparent channel sounding instruction. A specific name of the channel sounding instruction is not limited in this embodiment of this application.

In some embodiments, the association information may be carried in a user association frame. For example, the AP 1 sends a user association frame to the AP 2, and the user association frame may carry the association information associated with the channel sounding result of the STA 1. It may also be considered that the controller may send the channel sounding instruction to the AP 1, where the channel sounding instruction may be used to indicate to perform channel sounding on the received channel sounding frame, and send the user association frame to the AP 2, where the user association frame is used to carry the association information associated with the channel sounding result of the STA 1. It should be noted that a specific name of the user association frame is not limited in this embodiment of this application. In other words, in some embodiments, the user association frame may have another name.

The AP 1 does not know a specific AP that needs to obtain a channel sounding result of a STA associated with the AP 1. Therefore, if the AP 1 sends, by default, a user association frame corresponding to the STA associated with the AP 1 to a plurality of other APs, signaling overheads of the AP 1 are increased, and processing workload of the AP 1 is increased. Therefore, in this embodiment of this application, when the AP 2 needs to obtain the channel sounding result of the STA 1, the controller may indicate the AP 1 to send the user association frame corresponding to the STA 1 to the AP 2. Similarly, when the AP 1 needs to obtain the channel sounding result of the STA 2, the controller may indicate the AP 2 to send a user association frame corresponding to the STA 2 to the AP 1.

For example, when the AP 2 needs to obtain the channel sounding result of the STA 1, the controller may send the channel sounding instruction to the AP 1. The channel sounding instruction may be used to indicate the AP 1 to perform channel sounding on a channel sounding frame from the STA 1, and send the user association frame to the AP 2. In other words, only after receiving the channel sounding instruction, the AP 1 sends the user association frame to the AP 2. If receiving no channel sounding instruction, the AP 1 does not send the user association frame to the AP 2. In this way, the AP 1 does not send an unnecessary user association frame, and system resources are saved. Similarly, when the AP 1 needs to obtain the channel sounding result of the STA 2, the controller may send the channel sounding instruction to the AP 2. The channel sounding instruction may be used to indicate the AP 2 to perform channel sounding on a channel sounding frame from the STA 2, and send the user association frame to the AP 1. In other words, only after receiving the channel sounding instruction, the AP 2 sends the user association frame to the AP 1. If receiving no channel sounding instruction, the AP 2 does not send the user association frame to the AP 1. In this way, the AP 2 does not send an unnecessary user association frame, and system resources are saved.

Similarly, the AP 2 may receive PPDU packets sent by a plurality of STAs associated with the AP. If the AP 2 performs channel sounding on all received PPDU packets, unnecessary PPDU packet sounding is performed, and processing workload is heavy. Therefore, in some embodiments, the controller may notify a specific PPDU packet on which sounding is performed by the AP 2. In some embodiments, the controller may send the channel sounding instruction to the AP 2, and the AP 2 performs channel sounding on the received PPDU packet only after receiving the channel sounding instruction. In this way, a quantity of PPDU packets on which sounding is performed can be reduced, to reduce processing workload as much as possible.

It should be understood that the channel sounding instruction carries a destination address. For example, a destination address carried in the channel sounding instruction sent by the controller to the AP 1 may be an address of the AP 2, to indicate the AP 1 to send the user association frame to the AP 2. A plurality of STAs are associated with the AP 1. If the AP 1 sends, by default, user association frames respectively corresponding to all STAs associated with the AP 1 to the AP 2, unnecessary user association frames are sent. Therefore, the controller indicates the AP 1 to send a user association frame of a specific STA to the AP 2, to reduce workload of the AP 1. Therefore, in some embodiments, the channel sounding instruction further carries identification information of the STA, to indicate the AP 1 to send, to the AP 2, a user association frame corresponding to the STA indicated by the channel sounding instruction.

S602: The STA 1 sends a channel sounding frame, and the AP 1 and the AP 2 receive the channel sounding frame, where the channel sounding frame may be used for channel sounding.

The STA 1 sends the channel sounding frame, and both the AP 1 and the AP 2 can receive the channel sounding frame. It should be understood that the channel sounding frame sent by the STA 1 to the AP 1 and the channel sounding frame sent by the STA 1 to the AP 2 are a same channel sounding frame. To describe that the AP 1 and the AP 2 separately receive the channel sounding frame, S602 in FIG. 6 shows two steps.

S603: The AP 1 and the AP 2 perform channel sounding on the received channel sounding frame.

The AP 1 and the AP 2 may separately perform channel sounding on a received PPDU packet, to obtain a channel sounding result. In some embodiments, the AP 1 may store, in a first storage area, a channel sounding result of a STA associated with the AP 1, and store, in a second storage area, a channel sounding result of a STA not associated with the AP 1. When the AP 1 needs to obtain the channel sounding result of the STA not associated with the AP 1, the AP 1 may search the second storage area. Compared with a case that the AP 1 stores all obtained channel sounding results together, this can improve search efficiency in determining a channel sounding result of a STA. Certainly, the AP 1 may also store all the obtained channel sounding results in a common storage area. Similarly, the AP 2 may store, in a third storage area, a channel sounding result of a STA associated with the AP 2, and store, in a fourth storage area, a channel sounding result of a STA not associated with the AP 2. Alternatively, the AP 2 may store all obtained channel sounding results together. For example, the AP 2 may store all the obtained channel sounding results in a common storage area.

Because the STA 1 is associated with the AP 1, the AP 1 may receive the PPDU packet from the STA 1, and parse the PPDU packet to obtain identifier information of the STA 1, for example, identification information of the STA 1. The identification information of the STA 1 may be an ID of the STA 1, or may be a MAC address of the STA 1, or may be an interact protocol (IP) address of the STA 1, or other information that can identify an identity of the STA 1. This is not limited in this embodiment of this application. The STA 1 is not associated with the AP 2, and the AP 2 may not parse the PPDU packet received from the STA 1.

In this embodiment, the AP 1 may notify the AP 2 of the identification information of the STA 1 by using the user association frame, so that the AP 2 determines the channel sounding result of the STA 1 from a plurality of channel sounding results, and channel sounding is performed across APs. For ease of description, in the following, the channel sounding result of the STA 1 is referred to as a first channel sounding result, and a channel sounding result obtained after the AP 2 performs sounding on the PPDU packets sent by the plurality of STAs including the STA 1 is referred to as a second channel sounding result.

S604: The AP 1 sends a user association frame to the AP 2, where the user association frame carries the identification information of the STA 1.

The AP 1 may send the user association frame to the AP 2 based on the channel sounding instruction sent by the controller. The user association frame is intended to allow the AP 2 to determine the first channel sounding result from a plurality of second channel sounding results. It should be understood that, in addition to the identification information of the STA 1, the user association frame further includes some information used to identify a PPDU packet sent by the corresponding STA 1, so that the AP 2 determines a specific PPDU packet in the plurality of PPDU packets corresponding to the plurality of second channel sounding results as the PPDU packet sent by the STA 1. Therefore, a second channel sounding result corresponding to the PPDU packet may be used as the first channel sounding result.

In some embodiments, the user association frame may include a first receiving moment, in other words, a receiving moment at which the AP 1 receives the PPDU packet sent by the STA 1. If a difference between receiving moments at which the AP 1 and the AP 2 receive a PPDU packet is small, it may be considered that the PPDU packet separately received by the AP 1 and the AP 2 is a same PPDU packet. Therefore, in this embodiment, the user association frame may carry the first receiving moment at which the AP 1 receives the PPDU packet sent by the STA 1. The AP 2 may compare a difference between the first receiving moment and a second receiving moment of the plurality of received PPDU packets, to determine a specific PPDU packet in the plurality of received PPDU packets as the PPDU packet from the STA 1. Further, the channel sounding result of the PPDU packet from the STA 1 is determined as the first channel sounding result.

In this embodiment of this application, the AP 1 may perform timing synchronization with the AP 2. For example, the AP 1 and the AP 2 may perform periodic timing synchronization by sending a beacon frame (beacon). In this way, the AP 1 and the AP 2 may separately use system time points for receiving PPDU packets as receiving moments, to minimize an error of receiving moments separately recorded by the AP 1 and the AP 2 for receiving the same PPDU packet. Certainly, timing synchronization between the AP 1 and the AP 2 may alternatively be performed in another possible manner. This is not limited in this embodiment of this application. Before sending the user association frame to the AP 2, the AP 1 may obtain the system time point for receiving the PPDU packet as the first receiving moment.

In some other embodiments, different STAs may simultaneously send PPDU packets, the AP 2 may simultaneously receive a plurality of PPDU packets, and the plurality of PPDU packets are from different STAs. In this case, the AP 2 may mistakenly consider a PPDU packet sent by another STA as the PPDU packet sent by the STA 1. Alternatively, although a plurality of different STAs send PPDU packets at different moments, the AP 2 receives the PPDU packets sent by the plurality of STAs at close moments. Due to impact of factors such as a transmission delay, the AP 2 may also mistakenly consider a PPDU packet sent by another STA as the PPDU packet sent by the STA 1. Therefore, to further determine a specific PPDU packet that is from the STA 1, in this embodiment, the user association frame may further include packet length information. The packet length information may indicate a length of the PPDU packet sent by the STA 1. If lengths of two PPDU packets are the same or close to each other, the two PPDU packets may belong to the same packet. Therefore, the AP 2 may determine, from the plurality of PPDU packets based on the packet length information, the PPDU packet from the STA 1.

Before sending the user association frame to the AP 2, the AP 1 may obtain a length of the received PPDU packet sent by the STA 1. For example, the AP 1 may determine the length of the PPDU packet sent by the STA 1 in any one of the following three manners.

Obtaining manner 1: The length of the PPDU packet sent by the STA 1 may be determined based on information carried in a signal field of the PPDU.

For example, a length (LENGTH) field included in an L-SIG field included in a legacy PPDU packet may carry length information of the PPDU packet. The AP 1 may parse the LENGTH field to obtain a length of the PPDU packet.

For another example, an HT LENGTH field included in an HT-SIG 1 field included in a high throughput (HT) PPDU packet may carry, length information of the PPDU packet. The AP 1 may parse the LENGTH field to obtain a length of the PPDU packet.

For another example, an EHT LENGTH field included in an EHT-SIG field included in an extremely high throughput (EHT) PPDU packet may carry length information of the PPDU packet. The AP 1 may parse the LENGTH field to obtain a length of the PPDU packet.

Obtaining manner 2: The length of the PPDU packet sent by the STA 1 may be determined based on a difference of moments indicated by PHY-RXEND.indication and PHY-RXSTART.indication that are received by a MAC layer. The length of the PPDU packet may be determined based on the difference of moments.

Obtaining manner 3: The length of the PPDU packet sent by the STA 1 may be determined based on a start moment and an end moment of a CCA during reception of the PPDU packet by the AP 1. In other words, the length of the PPDU packet may be determined based on the start moment and the end moment of the CCA.

In some other embodiments, to more accurately determine the PPDU packet from the STA 1 from the plurality of PPDU packets, the user association frame may further include packet fingerprint information. The packet fingerprint information may include more information about the PPDU packet, to be specific, the packet fingerprint information may further include other information about the PPDU packet in addition to the packet length information. The PPDU packet from the STA 1 can be accurately determined based on the packet fingerprint information.

For example, the packet fingerprint information may be a plurality of or all fields carried in an L-SIG field or another SIG field in the PPDU packet. For example, the packet fingerprint information may be carried in an HT-SIG (HT-SIG 1 and/or HT-SIG 2) field in the PPDU packet. Before sending the user association frame, the AP 1 may obtain the packet fingerprint information from the foregoing fields in the PPDU packet from the STA 1.

It should be understood that information carried in the user association frame can ensure that the AP 2 correctly associates the second channel sounding result obtained by sounding the PPDU packet with a corresponding STA. In a possible implementation, the user association frame may carry one or more of the first receiving moment, the packet length information, and the packet fingerprint information.

The foregoing describes some possible information carried in the user association frame. The following describes a possible structure of the user association frame.

Figure 7:
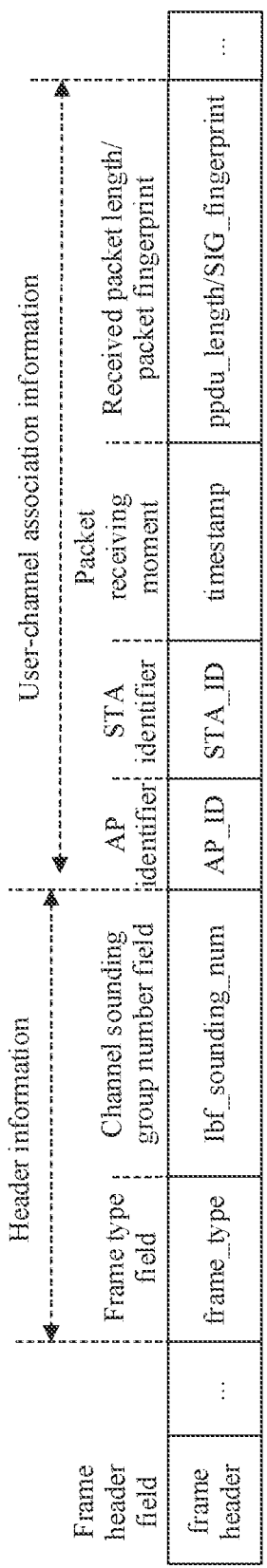
FIG. 7 is a schematic diagram of a structure of a user association frame according to an embodiment of this application.

FIG. 7 is a schematic diagram of a structure of the user association frame. The user association frame may include a plurality of fields, and the plurality of fields are used to carry some information for identifying the PPDU packet sent by the STA 1, for example, one or more of identification information of the STA 1, first receiving moment, packet length information, and packet fingerprint information. For example, the user association frame may include a STA identifier field (denoted as a STA_ID field) used to carry the identification information of the STA 1, an AP identifier field (denoted as an AP_ID field) used to carry the identification information of the AP 1, a packet receiving moment field (denoted as a timestamp field) used to carry the first receiving moment, a received packet length field (denoted as a PPDU_length field) used to carry the packet length information, and a received packet fingerprint field (a SIG_fingerprint field) that carries the packet fingerprint information. It should be noted that one or more of the foregoing information may be separately carried in different fields, or in one field that is reused. This is not limited in this embodiment of this application. For example, the packet length information and the packet fingerprint information may reuse a field including the L-SIG field and another field formed by the SIG field that are included in the PPDU packet in the 802.11 standard.

Due to a plurality of APs in the network, each AP is associated with a plurality of STAs. Each AP may need to obtain a channel sounding result of one or more STAs associated with the AP, or may need to obtain a channel sounding result of one or more STAs not associated with the AP; or may need to obtain both the channel sounding result of the one or more STAs associated with the AP and the channel sounding result of the one or more STAs not associated with the AP. The AP may classify channels between the AP and the STAs associated with the AP into one channel sounding group, and classify channels between the AP and the STAs not associated with the AP into another channel sounding group. To determine a specific channel sounding group for each sounding, the user association frame may further include a field (which may be referred to as a channel sounding number field) used to carry a channel sounding group number (bif_sounding_num).

It should be understood that the channel sounding group number may be considered as an identifier used to distinguish between different channel sounding groups. For example, in some embodiments, in one channel sounding process, the channel sounding group number carried in the user association frame may be one channel sounding group number, or may be a plurality of same channel sounding group numbers, indicating that the AP 2 needs to obtain channel sounding results of a plurality of STAs belonging to a same channel sounding group. Alternatively, in one channel sounding process, a channel sounding group number carried in the user association frame may be a plurality of different channel sounding group numbers. The different channel sounding group numbers correspond to different channel sounding groups, indicating that the AP 2 needs to obtain channel sounding results of a plurality of STAs belonging to the different channel sounding groups. Alternatively, in a plurality of channel sounding processes, the user association frame carries a plurality of channel sounding group numbers that can distinguish different times of channel sounding.

To distinguish from a frame with another function, the user association frame further includes a frame type field used to distinguish a frame type, and some necessary information required for transmitting the frame data. The necessary information may be encapsulated in one field (which may be referred to as a frame header field in this specification). A frame header format may be an Ethernet frame header format, a frame header format specified in the 802.11 protocol, or the like, or may be a frame header format agreed upon by both communication parties. This is not shown in this embodiment of this application. The frame type field may indicate a type of data carried in the user association frame, and is used to distinguish the user association frame from another frame. Compared with the AP identifier field, the STA identifier field, and the like, the frame type field and the channel sounding group number field may be considered as being used to carry header information of the user association frame. Fields such as the AP identifier field and the STA identifier field are used to carry association information between a user and a channel (which may be referred to as user-channel association information), in other words, being used to determine information about the first channel sounding result from the plurality of second channel sounding results.

S605: The AP 2 determines the first channel sounding result that matches the STA 1 from the plurality of second channel sounding results.

If the user-channel association information carried in the user association frame is different, a manner in which the AP 2 determines the first channel sounding result from the plurality of second channel sounding results are also different, which are separately described in the following.

Determining manner 1: The user association frame carries the first receiving moment, so that the AP 2 determines the first channel sounding result from the plurality of second channel sounding results based on the first receiving moment.

When receiving the user association frame, the AP 2 may obtain second receiving moments of the PPDU packets separately corresponding to the plurality of second channel sounding results, to obtain a plurality of second receiving moments. Then, the AP 2 may compare the first receiving moment with the plurality of second receiving moments, and determine, from the plurality of second receiving moments, a second receiving moment that meets a first preset condition. The first preset condition may be that a difference between the second receiving moment corresponding to the second channel sounding result and the first receiving moment falls within a first preset range. For example, if the second receiving moment is the same as the first receiving moment, in other words, the AP 1 and the AP 2 simultaneously receive a PPDU packet, it may be considered that the PPDU packet is from a same STA. For another example, if both the AP 1 and the AP 2 receive a PPDU packet, and a difference between a second receiving moment at which the AP 2 receives the PPDU packet and a first receiving moment at which the AP 1 receives the PPDU packet is small, it may also be considered that the PPDU packet is from a same STA. Further, the AP 2 may determine the second channel sounding result corresponding to the second receiving moment that meets the first preset condition as the first channel sounding result. In other words, the AP 2 may determine the second channel sounding result that meets the first preset condition in the plurality of second channel sounding results as the first channel sounding result.

It should be understood that the first preset range may be determined based on a timing synchronization error between the AP 1 and the AP 2, a packet transmission delay, a packet detection delay of the AP, and the like. In some embodiments, a maximum value of the first preset range may be a sum of the timing synchronization error between the AP 1 and the AP 2, the packet transmission delay, the packet detection delay of the AP, and the like.

The user association frame carries the first receiving moment and the packet length information. The packet length information indicates a first packet length. The AP 2 determines the first channel sounding result from the plurality of second channel sounding results based on the first receiving moment and the first packet length.

There may be one or more second channel sounding results that meet the first preset condition and that are determined by the AP 2 based on the first receiving moment. The AP 2 further determines the first channel sounding result from the second channel sounding result that meets the first preset condition based on the packet length information.

If there is one second channel sounding result that meets the first preset condition, the AP 2 may obtain a second packet length of a PPDU packet corresponding to the second channel sounding result, and compare the second packet length with the first packet length, to further determine whether the second channel sounding result is the first channel sounding result. If the second packet length is the same as or close to the first packet length, the AP 2 determines that the second channel result is the first channel sounding result.

If there are a plurality of second channel sounding results that meet the first preset condition, the AP 2 may obtain second packet lengths of PPDU packets separately corresponding to the plurality of second channel sounding results, to obtain a plurality of second packet lengths. Then, the AP 2 may compare the first packet length with the plurality of second packet lengths, and determine, from the plurality of second packet lengths, a second packet length that meets a second preset condition. The second preset condition is that the second packet length of the PPDU packet corresponding to the second channel sounding result is the same as the length of the PPDU packet received by the AP 1 from the STA 1 are the same or have a minimum difference. To be specific, the AP 2 may obtain lengths of the PPDU packets separately corresponding to a plurality of second channel sounding results, and if the length and the length of the PPDU packet received by the AP 1 from the STA 1 are the same or have the minimum difference, the corresponding PPDU packet and the PPDU packet sent by the STA 1 are the same packet. Further, the AP 2 may determine a second channel sounding result corresponding to the second packet length that meets the second preset condition as the first channel sounding result.

Determining manner 3: The user association frame carries the packet fingerprint information. The AP 2 determines the first channel sounding result from the plurality of second channel sounding results based on the packet fingerprint information.

After receiving the user association frame, the AP 2 obtains packet fingerprint information carried in the user association frame. The AP 2 may obtain packet fingerprint information carried in the received a plurality of PPDU packets. For example, the AP 2 obtains packet fingerprint information carried in the HT-SIG (UT-SIG 1 and/or HT-SIG 2) field in the PPDU packet. In a case in which the AP 2 compares the first receiving moment with the plurality of second receiving moments and determines that there are a plurality of second channel sounding results that meet the first preset condition, the AP 2 may further determine, based on the packet fingerprint information, a second channel sounding result that meets a third preset condition in the plurality of second channel sounding results as the first channel sounding result. It should be understood that the third preset condition is that packet fingerprint information of a PPDU packet corresponding to the second channel sounding result is the same as the packet fingerprint information carried in the user association frame. In other words, the third preset condition is that the packet fingerprint information of the PPDU packet corresponding to the second channel sounding result is the same as packet fingerprint information of the PPDU packet sent by STA 1.

Alternatively, in a case that the AP 2 determines that there are a plurality of second channel sounding results that meet the first preset condition, the AP 2 may further determine, based on the packet fingerprint information, a second channel sounding result that meets a third preset condition in the plurality of second channel sounding results as the first channel sounding result. It should be understood that the third preset condition is that packet fingerprint information of a PPDU packet corresponding to the second channel sounding result is the same as the packet fingerprint information carried in the user association frame. In other words, the third preset condition is that the packet fingerprint information of the PPDU packet corresponding to the second channel sounding result is the same as packet fingerprint information of the PPDU packet sent by STA 1.

It should be noted that, in some embodiments, the user association frame may carry the packet length information and the packet fingerprint information. After receiving the user association frame, the AP 2 may determine the first channel sounding result from the plurality of second channel sounding results based on the packet fingerprint information in the user association frame, to ensure accuracy of the determined first channel sounding result. Alternatively, the first channel sounding result may be first determined from a plurality of second channel sounding results based on the packet length information of the user association frame. If it is determined that there are at least two second channel sounding results that may be the first channel sounding result, the first channel sounding result is determined from the at least two second channel sounding results based on the packet fingerprint information. In this way, while ensuring accuracy of the first channel sounding result, a quantity of fields to be parsed that carry the packet fingerprint information may be reduced, in other words, processing workload of the AP 2 is reduced, so that efficiency in determining the first channel sounding result is improved as much as possible.

S606: The AP 1 and the AP 2 send a channel sounding announcement frame to the controller or the central access point, where the channel sounding announcement frame is used to notify a channel sounding state, and the channel sounding state indicates that a channel sounding result is correct, incorrect, or lost.

After sending the user association frame to the AP 2, the AP 1 may send the channel sounding announcement frame to the controller or the central access point, to indicate to the controller or the central access point that the channel sounding result is correct, incorrect, or lost, so that the controller or the central access point determines whether to continue channel sounding or perform data transmission. Similarly, the AP 2 may also send a channel sounding announcement frame to the controller or the central access point. For example, if the channel sounding announcement frame indicates that the channel sounding result is correct, the controller or the central access point may control the AP 1 and/or the AP 2 to perform data transmission. Alternatively, if the channel sounding announcement frame indicates that the channel sounding result is incorrect or lost, the controller or the central access point may control the AP 1 and/or the AP 2 to continue to perform channel sounding.

Figure 8:
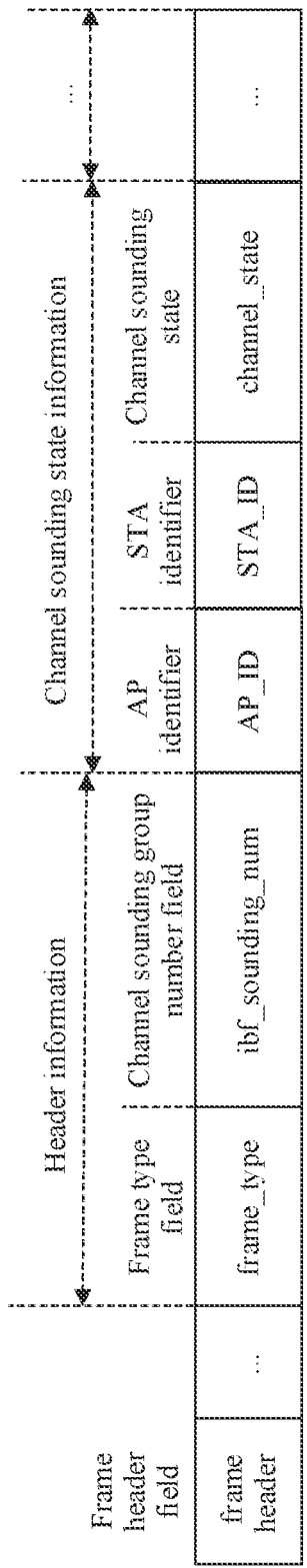
FIG. 8 is a schematic diagram of a structure of a channel sounding announcement frame according to an embodiment of this application.

As an example of the channel sounding announcement frame, FIG. 8 is a schematic diagram of a structure of the channel sounding announcement frame according to an embodiment of this application. Similar to the frame structure shown in FIG. 7, the channel sounding announcement frame includes a frame header field, and a frame type field and a channel sounding group number field that are used to carry a head channel. The channel sounding announcement frame further includes a field used to carry channel sounding state information (for example, identification information of an AP, identification information of a STA, and a channel sounding state). In some embodiments, the field used to carry the identification information of the AP is referred to as an AP identifier field (which may be denoted as an AP ID). The field used to carry the identification information of the STA is referred to as a STA identifier field (which may be denoted as STA_ID). The field used to carry the channel sounding state of the STA is referred to as a user channel sounding state field (which may be denoted as channel_state). In some embodiments, the channel sounding announcement frame may include a plurality of STA identifier fields and a plurality of corresponding user channel sounding state fields, and one STA identifier field corresponds to one user channel sounding state field. The plurality of STA identifier fields may include STAs associated with an AP 1, or may include STAs not associated with the AP 1.

Similar to a user association frame, the channel sounding announcement frame may further include a channel sounding number field (which may be denoted as bif_sounding_num). For details, refer to the description of the embodiment related to FIG. 7. Details are not described herein again.

Certainly, to distinguish from a frame with another function, the user association frame further includes a frame type field used to distinguish a frame type, and some necessary information required for transmitting frame data. The necessary information may be encapsulated in one field (which may be referred to as a frame header field in this specification). A frame header format may be an Ethernet frame header format, a frame header format specified in the 802.11 protocol, or the like, or may be a frame header format agreed upon by both communication parties. This is not shown in this embodiment of this application. The frame type field may indicate a type of data carried in the user association frame, and is used to distinguish the user association frame from another frame.

In this embodiment of this application, the user association frame carries the identification information of the first station associated with the first access point, and the first access point may send the user association frame to the second access point. In this way, the second access point can learn of the identification information of the first station, to determine the first channel sounding result that matches the first station from the plurality of second channel sounding results that are obtained from the channel sounding frames reported by the plurality of stations. In other words, channel sounding is performed across access points, so that a plurality of intra-frequency deployed adjacent access points can concurrently send data, and a data transmission rate in an entire network is improved.

It should be noted that the channel sounding method provided above may be extended to RSS or RSSI sounding. Similar to channel sounding, in an RSS or RSSI sounding process, a STA 1 may send a signal sounding frame to the AP 1 and the AP 2, and the signal sounding frame may be used for RSS or RSSI sounding. It should be understood that the signal sounding frame may also be a PPDU packet, provided that the signal sounding frame can be used for RSS or RSSI sounding on a packet.

The AP 1 may record a receiving moment of each signal sounding frame, and perform sounding on the signal sounding frame, to obtain a first signal quality sounding result. The AP 2 may record a receiving moment of each signal sounding frame, and perform sounding on the signal sounding frame to obtain a second signal quality sounding result.

A controller or a central access point may send a signal quality sounding instruction to the AP 1. After receiving the channel sounding instruction, the AP 1 may send the user association frame to the AP 2. The user association frame carries identification information of the STA 1. The controller or the central access point may also send a signal quality sounding instruction to the AP 2. The AP 2 receives the signal quality sounding instruction, and may determine, based on the identification information of the STA 1 carried in the user association frame, a first signal quality sounding result corresponding to the STA 1 from a plurality of obtained second signal quality sounding results.

During the RSS or RSSI sounding, the user association frame may also include packet length information and/or packet fingerprint information. For details, refer to related descriptions in the foregoing this embodiment of the channel sounding method, and details are not described herein again.

In this embodiment of this application, the user association frame carries the identification information of the first station associated with the first access point, and the first access point may send the user association frame to the second access point. In this way, the second access point can learn of the identification information of the first station, to determine the first signal quality sounding result that matches the first station from the plurality of second signal quality sounding results that are obtained from the signal sounding frames reported by the plurality of stations. In other words, signal quality sounding is performed across access points.

Figure 9:
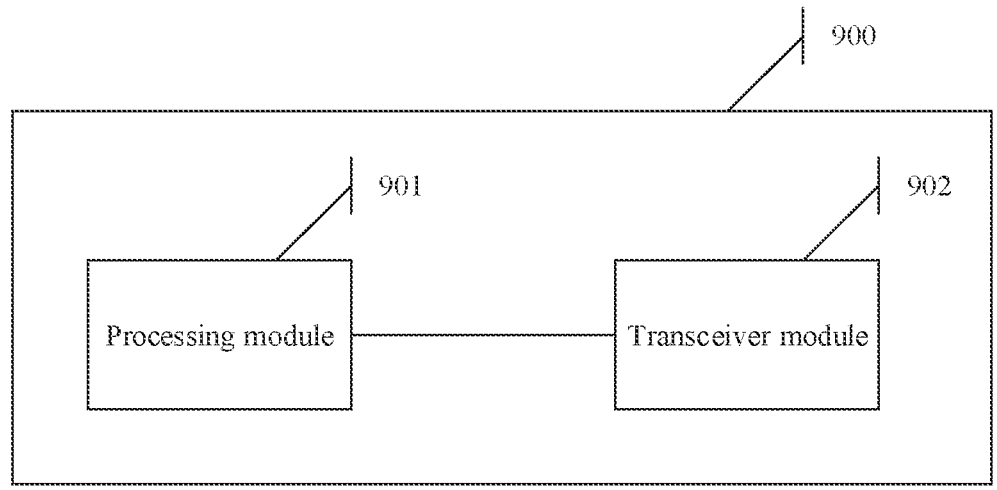
FIG. 9 is a schematic diagram of a structure of a communication apparatus according to an embodiment of this application.

FIG. 9 is a schematic diagram of a structure of a communication apparatus 900. The communication apparatus 900 may correspondingly implement functions or steps of an AP 1 or an AP 2 in the method embodiments. The communication apparatus may include a processing module 901 and a transceiver module 902, and optionally, may further include a storage module. The storage module may be configured to store instructions (code or a program) and/or data. The processing module 901 and the transceiver module 902 may be coupled to the storage unit. For example, the processing module 901 may read the instructions (the code or the program) and/or the data in the storage unit, to implement a corresponding method. The foregoing modules may be disposed independently, or may be partially or totally integrated.

In some possible implementations, the communication apparatus 900 can correspondingly implement behavior and functions of the first access point (AP 1) in the foregoing method embodiments. For example, the communication apparatus 900 may be the AP 1, or may be a component (for example, a chip or a circuit) used in the AP 1. The transceiver module 902 may be configured to perform all receiving or sending operations performed by the AP 1 in the embodiment shown in FIG. 6, for example, S602, S604, S605, and S606 in the embodiment shown in FIG. 6, and/or configured to support another process of the technology described in this specification. The processing module 901 is configured to perform all operations, other than the receiving and sending operations, performed by the AP 1 in the embodiment shown in FIG. 6, and/or configured to support another process of the technology described in this specification.

In some embodiments, the processing module 901 is configured to perform channel sounding on a channel sounding frame sent by a first station. The transceiver module 902 is configured to send a user association frame to the second access point. The channel sounding frame is used for channel sounding, and the first station is associated with the first access point. The user association frame carries identification information of the first station, and is used to determine a first channel sounding result that matches the first station from a plurality of second channel sounding results. The plurality of second channel sounding results are obtained by the second access point by performing sounding on a plurality of channel sounding frames from a plurality of stations. The plurality of stations include the first station, and the first station is not associated with the second access point.

In an optional implementation, the transceiver module 902 is specifically configured to:
  receive a channel sounding instruction from a controller or a central access point, and send the user association frame to the second access point. The channel sounding instruction indicates the first access point to perform channel sounding and send the user association frame to the second access point.

In an optional implementation, the user association frame carries a first receiving moment. The first receiving moment is a receiving moment at which the first access point receives the channel sounding frame sent by the first station. The first receiving moment is determined based on a system time point of the first access point. The system time point of the first access point is synchronized with system time of the second access point.

In an optional implementation, the user association frame further includes packet length information and/or packet fingerprint information. The packet length information indicates a length of the channel sounding frame received by the first access point from the first station. The packet fingerprint information includes the packet length information.

In an optional implementation, the packet length information is determined based on information carried in a signal field in a PPDU, where the channel sounding frame is carried in the PPDU.

Alternatively, the packet length information is determined based on a difference of moments indicated by PHY-RX-END.indication and PHY-RXSTART.indication that are received by a MAC layer.

Alternatively, the packet length information is determined based on a start moment and an end moment of a CCA during reception of the channel sounding frame sent by the first station.

In an optional implementation, the channel sounding frame received by the first access point from the first station is carried in a PPDU. The packet fingerprint information is determined based on information carried in a signal field in the PPDU.

In an optional implementation, the transceiver module 902 is further configured to:
  send a channel sounding announcement frame to the controller or the central access point. The channel sounding announcement frame includes a channel sounding state. The channel sounding state indicates that a channel sounding result is correct, incorrect, or lost.

In some other embodiments, the processing module 901 is configured to perform channel sounding on a first signal sent by the first station. The transceiver module 902 is configured to send the user association frame to the second access point. The first signal is used for RSS or RSSI sounding, and the first station is associated with the first access point. The user association frame carries identification information of the first station, and is used to determine a first signal quality sounding result that matches the first station from a plurality of second signal quality sounding results. The plurality of second signal quality sounding results are obtained by the second access point by performing sounding on a plurality of first signals from a plurality of stations. The plurality of stations include the first station, and the first station is not associated with the second access point.

In an optional implementation, the transceiver module 902 is specifically configured to:
  receive a channel sounding instruction from a controller or a central access point, and send the user association frame to the second access point. The channel sounding instruction indicates the first access point to perform sounding on a received signal sounding frame and send the user association frame to the second access point.

In an optional implementation, the user association frame carries a first receiving moment. The first receiving moment is a receiving moment at which the first access point receives the signal sounding frame sent by the first station. The first receiving moment is determined based on a system time point of the first access point. The system time point of the first access point is synchronized with system time of the second access point.

In an optional implementation, the user association frame further includes packet length information and/or packet fingerprint information. The packet length information indicates a length of the signal sounding frame received by the first access point from the first station. The packet fingerprint information includes the packet length information.

In an optional implementation, the packet length information is determined based on information carried in a signal field in a PPDU, where the signal sounding frame is carried in the PPDU.

Alternatively, the packet length information is determined based on a difference of moments indicated by a physical layer receive end indication PHY-RXEND.indication and a physical layer receive start indication PHY-RXSTART.indication that are received by a MAC layer.

Alternatively, the packet length information is determined based on a start moment and an end moment of a CCA during reception of the signal sounding frame sent by the first station.

In an optional implementation, the signal sounding frame received by the first access point from the first station is carried in a PPDU. The packet fingerprint information is determined based on information carried in a signal field in the PPDU.

In an optional implementation, the transceiver module 902 is further configured to:
send a signal quality sounding announcement frame to the controller or the central access point. The signal quality announcement frame includes a signal quality sounding state. The signal quality sounding state indicates that signal quality is correct, incorrect, or lost.

In some possible implementations, the communication apparatus 900 can correspondingly implement behavior and functions of the second access point (the AP 2) in the foregoing method embodiments. For example, the communication apparatus 900 may be the AP 2, or may be a component (for example, a chip or a circuit) used in the AP 2. The transceiver module 902 may be configured to perform all receiving or sending operations performed by the AP 2 in the embodiment shown in FIG. 6, for example, S601, S602, S603, and S607 in the embodiment shown in FIG. 6, and/or configured to support another process of the technology described in this specification. The processing module 901 is configured to perform all operations, other than the receiving and sending operations, performed by the AP 1 in the embodiment shown in FIG. 6, and/or configured to support another process of the technology described in this specification.

In some embodiments, the transceiver module 902 is configured to receive a user association frame from a first access point. The user association frame carries identification information of a first station and is used to determine a first channel sounding result of the first station. The first station is associated with the first access point. The processing module 901 is configured to determine a first channel sounding result from a plurality of second channel sounding results based on the user association frame. The plurality of second channel sounding results are obtained by the second access point by performing sounding on a plurality of channel sounding frames from a plurality of stations. The channel sounding frame is used for channel sounding.

In an optional implementation, the processing module 901 is further configured to:
after the transceiver module 902 receives a channel sounding instruction from a controller or a central access point, determine the first channel soundings result from the plurality of second channel sounding results. The channel sounding instruction indicates the second access point to perform sounding on the plurality of channel sounding frames. The plurality of stations include the first station, and the first station is not associated with the second access point.

In an optional implementation, the processing module 901 is specifically configured to:
determine at least one second channel sounding result that meets a first preset condition in the plurality of second channel sounding results as the first channel sounding result The first preset condition is that a difference between a receiving moment of a channel sounding frame corresponding to the second channel sounding result and a receiving moment of a channel sounding frame received by the first access point from the first station falls within a first preset range.

In an optional implementation, the processing module 901 is further configured to:
determine, based on packet length information, the first channel sounding result from the at least one second channel sounding result that meets the first preset condition, where the packet length information indicates a length of the channel sounding frame sent by the first station to the first access point, and the packet length information is carried in the user association frame; and/or
determine, based on packet fingerprint information, the first channel sounding result from the at least one second channel sounding result that meets the first preset condition, where the packet fingerprint information indicates length information of a channel sounding frame sent by the first station to the first access point, and the packet fingerprint information is carried in the user association frame.

In an optional implementation, the processing module 901 is specifically configured to:
determine a second channel sounding result that meets a second preset condition in the at least one second channel sounding result that meets the first preset condition as the first channel sounding result. The second preset condition is that a packet length of the channel sounding frame corresponding to the second channel sounding result and a packet length of the channel sounding frame received by the first access point from the first station are the same or have a minimum difference.

In an optional implementation, the processing module 901 is specifically configured to:
determine a second channel sounding result that meets a third preset condition in the at least one second channel sounding result that meets the first preset condition as the first channel sounding result. The third preset condition is that packet fingerprint information of the channel sounding frame corresponding to the second channel sounding result is the same as the packet fingerprint information.

In an optional implementation, the processing module 901 is further configured to:
perform timing synchronization with the first access point.

In some other embodiments, the transceiver module 902 is configured to receive a user association frame from a first access point. The user association frame carries identification information of a first station and is used to determine a signal quality sounding result of the first station. The first station is associated with the first access point. The signal quality is determined based on an RSS or an RSSI. The processing module 901 is configured to determine a first signal quality sounding result that matches the first station from a plurality of second signal quality sounding results based on the user association frame. The plurality of second signal quality sounding results are obtained by the second access point by performing sounding on a plurality of signal sounding frames from a plurality of stations.

In an optional implementation, the processing module 901 is specifically configured to:

after the transceiver module 902 receives a channel sounding instruction from a controller or a central access point, determine the first signal quality sounding result from the plurality of second signal quality sounding results. The channel sounding instruction indicates the second access point to perform sounding on the plurality of signal sounding frames. The plurality of stations include the first station, and the first station is not associated with the second access point.

In an optional implementation, the processing module 901 is specifically configured to:

determine at least one second signal quality sounding result that meets a first preset condition in the plurality of second signal quality sounding results as the first signal quality sounding result. The first preset condition is that a difference between a receiving moment of a signal sounding frame corresponding to the second signal quality sounding result and a receiving moment of a signal sounding frame received by the first access point from the first station falls within a first preset range.

In an optional implementation, the processing module 901 is further configured to:

determine, based on packet length information, the first signal quality sounding result from the at least one second signal quality sounding result that meets the first preset condition, where the packet length information indicates a length of the signal sounding frame sent by the first station to the first access point, and the packet length information is carried in the user association frame; and/or determine, based on packet fingerprint information, the first signal quality sounding result from the at least one second signal quality sounding result that meets the first preset condition, where the packet fingerprint information indicates length information of a signal sounding frame sent by the first station to the first access point, and the packet fingerprint information is carried in the user association frame.

In an optional implementation, the processing module 901 is specifically configured to:

determine a second signal quality sounding result that meets a second preset condition in the at least one second signal quality sounding result that meets the first preset condition as the first signal quality sounding result. The second preset condition is that a packet length of the signal sounding frame corresponding to the second signal quality sounding result and a packet length of the signal sounding frame received by the first access point from the first station are the same or have a minimum difference.

In an optional implementation, the processing module 901 is specifically configured to:

determine a second signal quality sounding result that meets a third preset condition in the at least one second signal quality sounding result that meets the first preset condition as the first signal quality sounding result. The third preset condition is that packet fingerprint information of the signal sounding frame corresponding to the second signal quality sounding result is the same as the packet fingerprint information.

In a possible implementation, the processing module 901 is further configured to:

perform timing synchronization with the first access point.

Figure 10:
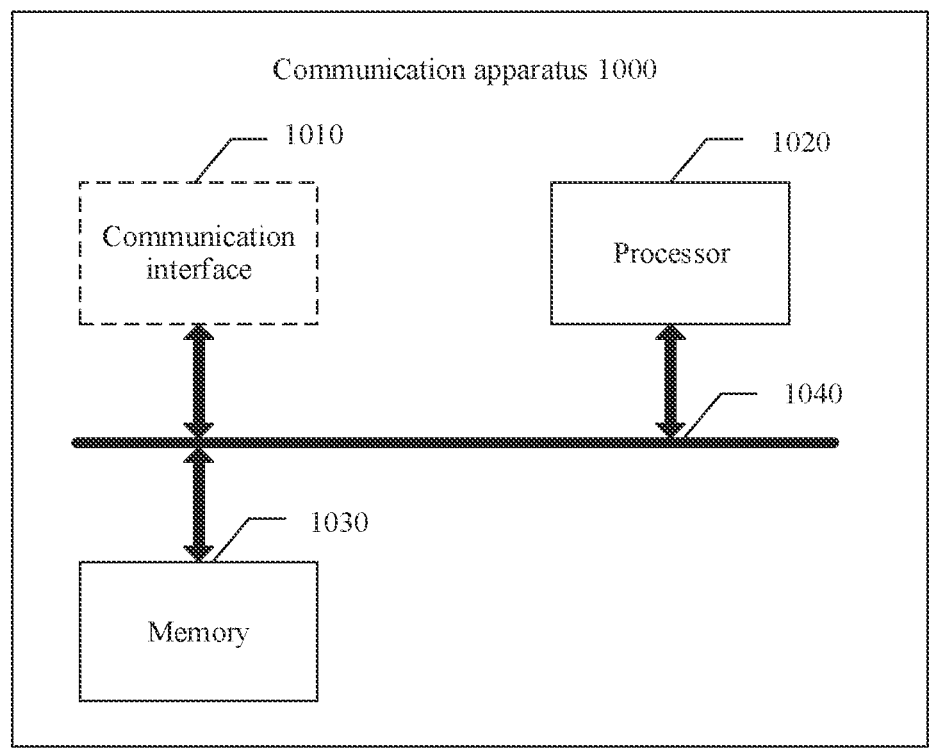
FIG. 10 is a schematic diagram of a structure of a communication apparatus according to an embodiment of this application.

FIG. 10 shows a communication apparatus 1000 according to an embodiment of this application. The communication apparatus 1000 may be an access point, and can implement a function of the first access point or the second access point in the methods provided in this embodiment of this application. Alternatively, the communication apparatus 1000 may be an apparatus that can support the first access point or the second access point to implement a corresponding function in the methods provided in this embodiment of this application. The communication apparatus 1000 may be a chip system. In this embodiment of this application, the chip system may include a chip, or may include a chip and another discrete component.

In hardware implementation, the transceiver module 902 may be a transceiver, and the transceiver is integrated into the communication apparatus 1000, to form a communication interface 1010.

The communication apparatus 1000 includes at least one processor 1020, configured to implement or support the communication apparatus 1000 to implement a function of the first access point or the second access point in the methods provided in this embodiment of this application. For details, refer to detailed descriptions in the method example. Details are not described herein again.

The communication apparatus 1000 may further include at least one memory 1030, configured to store program instructions and/or data. The memory 1030 is coupled to the processor 1020. The coupling in this embodiment of this application may be an indirect coupling or a communication connection between apparatuses, units, or modules in an electrical form, a mechanical form, or another form, and is used for information exchange between the apparatuses, the units, or the modules. The processor 1020 may cooperate with the memory 1030. The processor 1020 may execute the program instructions and/or the data stored in the memory 1030, so that the communication apparatus 1000 implements a corresponding method. At least one of the at least one memory may be included in the processor.

The communication apparatus 1000 may further include the communication interface 1010, configured to communicate with another device by using a transmission medium, so that an apparatus used in the communication apparatus 1000 can communicate with the another device. For example, when the communication apparatus is the first access point, the another device is the second access point, a central access point, or a station Alternatively, when the communication apparatus is the second access point, the another device is the first access point, a central access point, or a station. The processor 1020 may send and receive data through the communication interface 1010. The communication interface 1010 may be specifically a transceiver.

A specific connection medium between the communication interface 1010, the processor 1020, and the memory 1030 is not limited in this embodiment of this application. In this embodiment of this application, the memory 1030, the processor 1020, and the communication interface 1010 are connected to each other through a bus 1040 in FIG. 10. The bus is represented by using a thick line in FIG. 10. A connection manner between other components is only an example for descriptions, and is not limited thereto. The bus may be classified into an address bus, a data bus, a control bus, and the like. For ease of representation, only one thick line is for representing the bus in FIG. 10, but this does not mean that there is only one bus or only one type of bus.

In this embodiment of this application, the processor 1020 may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in this embodiment of this application. The general purpose processor may be a microprocessor or any conventional processor or the like. The steps of the method disclosed with reference to this embodiment of this application may be directly performed by a hardware processor, or may be performed by using a combination of hardware in the processor and a software module.

In this embodiment of this application, the memory 1030 may be a non-volatile memory, such as a hard disk drive (HDD) or a solid-state drive (SSD), or may be a volatile memory, such as a random access memory (RAM). The memory is any other medium that can carry or store expected program code in a form of an instruction or a data structure and that can be accessed by a computer, but is not limited thereto. The memory in this embodiment of this application may alternatively be a circuit or any other apparatus that can implement a storage function, and is configured to store the program instructions and/or the data.

It should be noted that the communication apparatus in the foregoing embodiment may be a terminal device, a circuit, or a chip used in the terminal device, or may be another combined component or component that has functions of the terminal device. When the communication apparatus is the terminal device, the transceiver unit may be a transceiver, and may include an antenna, a radio frequency circuit, and the like. The processing module may be a processor, for example, a central processing unit (CPU). When the communication apparatus is the component that has functions of the terminal device, the transceiver unit may be a radio frequency unit, and the processing module may be the processor. When the communication apparatus is the chip system, the transceiver unit may be an input/output interface of the chip system, and the processing module may be a processor of the chip system.

An embodiment of this application further provides a communication system. Specifically, the communication system includes a first access point, a second access point, and a station, or may further include more first access points and/or more second access points, and a plurality of stations. For example, the communication system includes the first access point and the second access point that are configured to implement related functions in FIG. 6. Alternatively, the communication system includes the first access point, the second access point, and the station that are configured to implement related functions FIG. 6.

The first access point and the second access point are separately configured to implement functions of the access point related to FIG. 6. The station is configured to implement functions of the foregoing station related to FIG. 6. For details, refer to the related descriptions in the method embodiment. Details are not described herein again.

An embodiment of this application further provides a computer-readable storage medium, including instructions. When the instructions are run on a computer, the computer performs the method performed by the first access point or the second access point in FIG. 6; or when the instructions are run on a computer, the computer performs the method performed by the station in FIG. 6.

An embodiment of this application further provides a computer program product, including instructions. When the computer program product runs on a computer, the computer is enabled to perform the methods performed by the first access point or the second access point in FIG. 6. Alternatively, when the computer program product runs on a computer, the computer is enabled to perform the method performed by the station in FIG. 6.

An embodiment of this application provides a chip system. The chip system includes a processor, and may further include a memory. The chip system is configured to implement functions of the first access point and the second access point in the foregoing methods, or is configured to implement functions of the first access point, the second access point, and the station in the foregoing methods. The chip system may include a chip, or may include a chip and another discrete component.

It should be understood that the terms "system" and "network" may be used interchangeably in embodiments of this application. "At least one" means one or more, and "a plurality of" means two or more. "And/or" describes an association relationship between associated objects, and indicates that three relationships may exist. For example, A and/or B may indicate the following three cases: A exists alone, both A and B exist, and B exists alone, where A and B may be singular or plural. The character "/" generally indicates an "or" relationship between the associated objects. At least one of the following items (pieces) or a similar expression thereof refers to any combination of these items, including any combination of singular items (pieces) or plural items (pieces). For example, at least one of a, b, or c may represent: a, b, c, a and b, a and c, b and c, or a, b, and c, where a, b, and c may be singular or plural.

In addition, unless otherwise stated, ordinal numbers such as "first" and "second" in embodiments of this application are for distinguishing between a plurality of objects, but are not intended to limit an order, a time sequence, priorities, or importance of the plurality of objects. For example, a first access point and a second access point are merely intended to distinguish between different access points, but do not indicate that the two access points are different in a priority, a sending sequence, or importance.

It should be understood that the processor in embodiments of this application may be a CPU, or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be understood that the memory mentioned in embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

It should be noted that when the processor is a general purpose processor, a DSP, an ASIC, an FPGA or another programmable logic device, a discrete gate, a transistor logic device, or a discrete hardware component, the memory (a storage module) is integrated into the processor.

It should be noted that the memory described in this specification is intended to include but not limited to these memories and any memory of another proper type.

It should be understood that sequence numbers of the foregoing processes do not mean execution sequences in embodiments of this application. The execution sequences of the processes should be determined based on functions and internal logic of the processes, and should not constitute any limitation on implementation processes of embodiments of this application.

A person skilled in the art may be aware that units and algorithm steps in the examples described with reference to the embodiments disclosed in this specification can be implemented by electronic hardware or an interaction of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses, and methods may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or other forms.

The units described as separate parts may or may not be physically separate. Parts displayed as units may or may not be physical units, and may be located in one position or may be distributed on a plurality of network units. Some or all of the units may be selected based on actual requirements to achieve the objectives of the solutions in embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A channel sounding method, comprising:
receiving, by a second access point, a user association frame from a first access point, wherein the user association frame carries identification information of a first station and is used to determine a first channel sounding result of the first station associated with the first access point; and
determining, by the second access point, the first channel sounding result from a plurality of second channel sounding results based on the user association frame, wherein the first channel sounding result is determined from at least one second channel sounding result in the plurality of second channel sounding results that satisfies a first preset condition, wherein the first preset condition is that a difference between a receiving moment of a channel sounding frame corresponding to the second channel sounding result and a receiving moment of a channel sounding frame received by the first access point from the first station falls within a first preset range, and wherein the plurality of second channel sounding results are obtained by the second access point by performing sounding on a plurality of channel sounding frames from a plurality of stations.

2. The method according to claim 1, wherein determining the first channel sounding result comprises:
receiving, by the second access point, a channel sounding instruction from a controller or a central access point; and
determining the first channel sounding result from the plurality of second channel sounding results, wherein the channel sounding instruction indicates the second access point to perform channel sounding on the plurality of channel sounding frames, and wherein the plurality of stations comprise the first station.

3. The method according to claim 1, wherein determining the first channel sounding result comprises:
determining, by the second access point based on packet length information, the first channel sounding result from the at least one second channel sounding result that satisfies the first preset condition, wherein the packet length information indicates a length of the channel sounding frame sent by the first station to the first access point, and the packet length information is carried in the user association frame; or determining, by the second access point based on packet fingerprint information, the first channel sounding result from the at least one second channel sounding result that satisfies the first preset condition, wherein the packet fingerprint information indicates length information of a channel sounding frame sent by the first station to the first access point, and the packet fingerprint information is carried in the user association frame.

4. The method according to claim 3, wherein determining the first channel sounding result comprises:
determining, by the second access point, a second channel sounding result that satisfies a second preset condition in the at least one second channel sounding result that satisfies the first preset condition as the first channel sounding result, wherein the second preset condition is that a packet length of the channel sounding frame corresponding to the second channel sounding result and a packet length of the channel sounding frame received by the first access point from the first station are the same or have a minimum difference.

5. The method according to claim 3, wherein determining the first channel sounding result comprises:
determining, by the second access point, a second channel sounding result that satisfies a third preset condition in the at least one second channel sounding result that satisfies the first preset condition as the first channel sounding result, wherein the third preset condition is that packet fingerprint information of the channel sounding frame corresponding to the second channel sounding result is the same as the packet fingerprint information.

6. The method according to claim 1, wherein the method further comprises:
performing, by the second access point, timing synchronization with the first access point.

7. A channel sounding method, comprising:
performing, by a first access point, channel sounding on a channel sounding frame sent by a first station associated with the first access point, wherein the channel sounding frame is used for channel sounding; and
sending, by the first access point, a user association frame to a second access point, wherein the user association frame carries identification information of the first station and is used to determine a first channel sounding result that matches the first station from a plurality of second channel sounding results, wherein the first channel sounding result is determined from at least one second channel sounding result in the plurality of second channel sounding results that satisfies a first preset condition, wherein the first preset condition is that a difference between a receiving moment of a channel sounding frame corresponding to the second channel sounding result and a receiving moment of a channel sounding frame received by the first access point from the first station falls within a first preset range, and wherein the plurality of second channel sounding results are obtained by the second access point by performing sounding on a plurality of channel sounding frames from a plurality of stations that comprise the first station.

8. The method according to claim 7, wherein sending the user association frame to the second access point comprises:

receiving, by the first access point, a channel sounding instruction from a controller or a central access point; and
sending the user association frame to the second access point, wherein the channel sounding instruction indicates the first access point to perform channel sounding and send the user association frame to the second access point.

9. The method according to claim 7, wherein the user association frame further comprises packet length information and packet fingerprint information, wherein the packet length information indicates a length of the channel sounding frame received by the first access point from the first station, and wherein the packet fingerprint information comprises the packet length information.

10. The method according to claim 9, wherein the packet length information is determined based on one of:
information carried in a signal field in a physical layer protocol data unit (PPDU), wherein the channel sounding frame is carried in the PPDU;
the packet length information is determined based on a difference of moments indicated by a physical layer receive end indication (PHY-RXEND.indication) and a physical layer receive start indication (PHY-RXSTART.indication) that are received by a media access control MAC layer; or
the packet length information is determined based on a start moment and an end moment of a clear channel assessment (CCA) during reception of the channel sounding frame sent by the first station.

11. The method according to claim 9, wherein the channel sounding frame received by the first access point from the first station is carried in a PPDU, and the packet fingerprint information is determined based on information carried in a signal field in the PPDU.

12. The method according to claim 8, wherein the method further comprises:
sending, by the first access point, a channel sounding announcement frame to the controller or the central access point, wherein the channel sounding announcement frame comprises a channel sounding state, and wherein the channel sounding state indicates that a channel sounding result is correct, incorrect, or lost.

13. A communication apparatus, comprising:
one or more processors; and
a memory communicably coupled to the one or more processors and storing instructions for execution by the one or more processors to:
receive a user association frame from a first access point, wherein the user association frame carries identification information of a first station and is used to determine a first channel sounding result of the first station associated with the first access point; and
determine the first channel sounding result from a plurality of second channel sounding results based on the user association frame, wherein the first channel sounding result satisfies a first preset condition, wherein the first preset condition is that a difference between a receiving moment of a channel sounding frame corresponding to the first channel sounding result and a receiving moment of a channel sounding frame received by the first access point from the first station falls within a first preset range, and wherein the plurality of second channel sounding results are obtained by a second access point by performing sounding on a plurality of channel sounding frames from a plurality of stations.

14. The apparatus according to claim 13, wherein the instructions are for execution by the one or more processors to:
after receiving a channel sounding instruction from a controller or the central access point, determine the first channel sounding result from the plurality of second channel sounding results, wherein the channel sounding instruction indicates the second access point to perform sounding on the plurality of channel sounding frames, the plurality of stations comprise the first station, and the first station is not associated with the second access point.

15. A communication apparatus, comprising:
one or more processors; and
a memory communicably coupled to the one or more processors and storing instructions for execution by the one or more processors to:
perform channel sounding on a channel sounding frame sent by a first station associated with a first access point, wherein the channel sounding frame is used for channel sounding; and
send a user association frame to a second access point, wherein the user association frame carries identification information of the first station and is used to determine a first channel sounding result that matches the first station from a plurality of second channel sounding results, wherein the user association frame carries a first receiving moment at which the first access point receives the channel sounding frame sent by the first station, wherein the first receiving moment is determined based on a system time point of the first access point, and wherein the system time point of the first access point is synchronized with a system time point of the second access point, and wherein the plurality of second channel sounding results are obtained by the second access point by performing sounding on a plurality of channel sounding frames from a plurality of stations that comprise the first station.

16. The apparatus according to claim 15, wherein the instructions are for execution by the one or more processors to:
receive a channel sounding instruction from a controller or a central access point; and
send the user association frame to the second access point, wherein the channel sounding instruction indicates the first access point to perform channel sounding and send the user association frame to the second access point.

* * * * *